United States Patent
Tate et al.

(10) Patent No.: US 12,079,717 B2
(45) Date of Patent: Sep. 3, 2024

(54) DATA PROCESSING APPARATUS, TRAINING APPARATUS, METHOD OF DETECTING AN OBJECT, METHOD OF TRAINING, AND MEDIUM

(71) Applicant: CANON KABUSHIKI KAISHA, Tokyo (JP)

(72) Inventors: Shunta Tate, Tokyo (JP); Tsewei Chen, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 963 days.

(21) Appl. No.: 16/918,206

(22) Filed: Jul. 1, 2020

(65) Prior Publication Data

US 2021/0004681 A1 Jan. 7, 2021

(30) Foreign Application Priority Data

Jul. 2, 2019 (JP) .................................. 2019-123945

(51) Int. Cl.
*G06N 3/08* (2023.01)
*G06N 3/04* (2023.01)

(52) U.S. Cl.
CPC .................. *G06N 3/08* (2013.01); *G06N 3/04* (2013.01)

(58) Field of Classification Search
CPC ............ G06N 3/08; G06N 3/04; G06N 3/044; G06N 3/045; G06N 3/067; G06N 3/086
See application file for complete search history.

(56) References Cited

U.S. PATENT DOCUMENTS 9,811,775 B2   11/2017   Krizhevsky

FOREIGN PATENT DOCUMENTS

JP   2007305072 A   11/2007

OTHER PUBLICATIONS

Barros, Pablo, et al. "A multichannel convolutional neural network for hand posture recognition." International Conference on Artificial Neural Networks. Springer, Cham, 2014. (Year: 2014).*
Krizhevsky "ImageNet Classification with Deep Convolutional Neural Networks" Advances in Neural Information Processing Systems. 2012: pp. 1-9.
Zeiler "Visualizing and Understanding Convolutional Networks." European Conference on Computer Vision. 2014: pp. 818-833.

(Continued)

*Primary Examiner* — Brian M Smith
(74) *Attorney, Agent, or Firm* — ROSSI, KIMMS & McDOWELL LLP

(57) ABSTRACT

There is provided with a data processing apparatus for detecting an object from an image using a hierarchical neural network. The data processing apparatus has parallel first and second neural networks. An obtaining unit obtains a table which defines different first and second portions. An operation unit performs calculation of the feature data of a third portion based on feature data of the first portion identified using the table and on a weighting parameter between first and second layers of the first neural network, and calculation of feature data of a fourth portion based on feature data of the second portion identified using the table and on a weighting parameter between the first and second layers of the second neural network.

18 Claims, 15 Drawing Sheets

(56) References Cited

OTHER PUBLICATIONS

Byeon "Scene Labeling with LSTM Recurrent Neural Networks." IEEE Conference on Computer Vision and Pattern Recognition. 2015: pp. 3547-3555.
Hinton "Distilling the Knowledge in a Neural Network" arXiv:1503.02531v1 . Mar. 9, 2015: pp. 1-9.

* cited by examiner

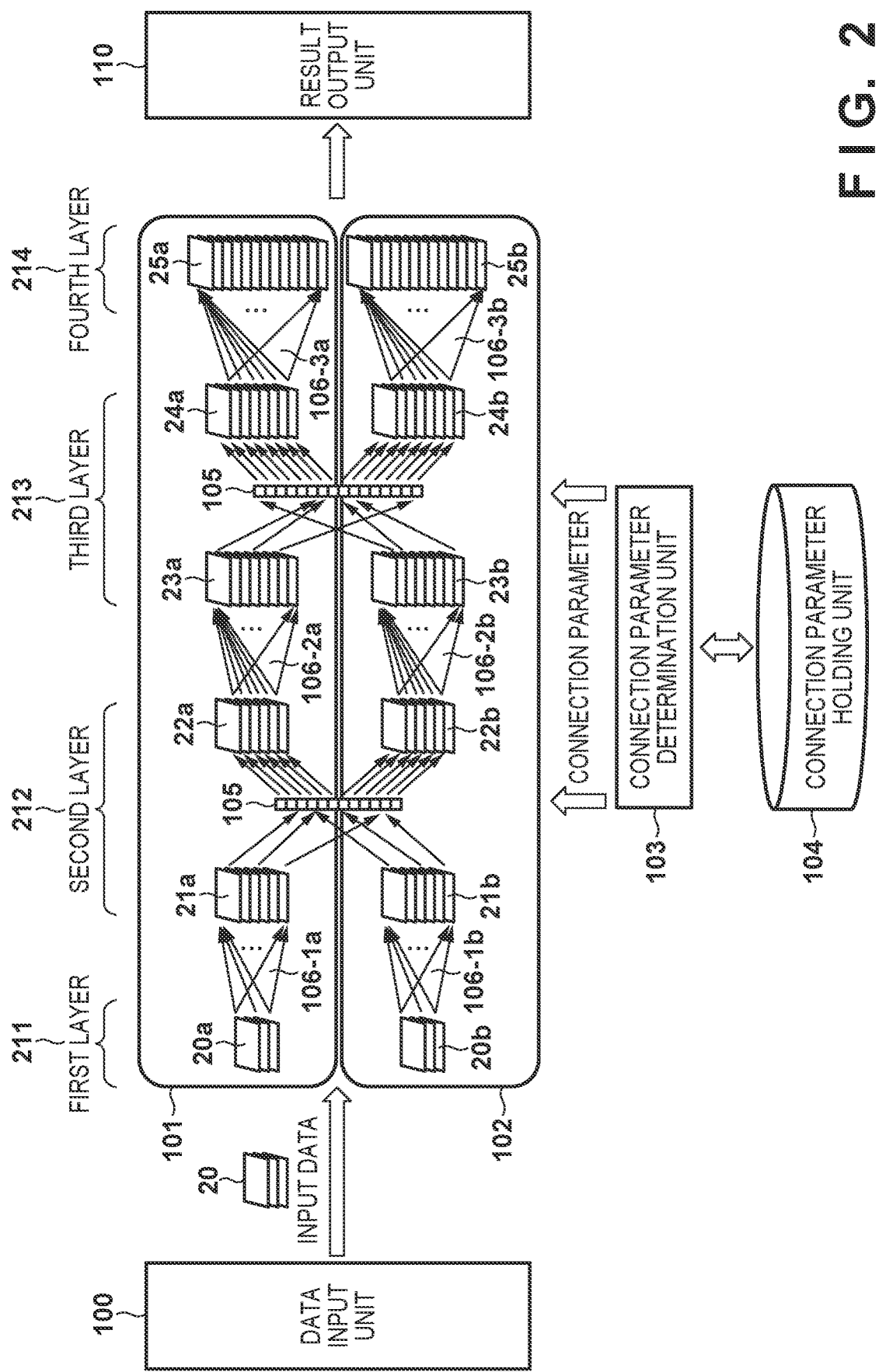

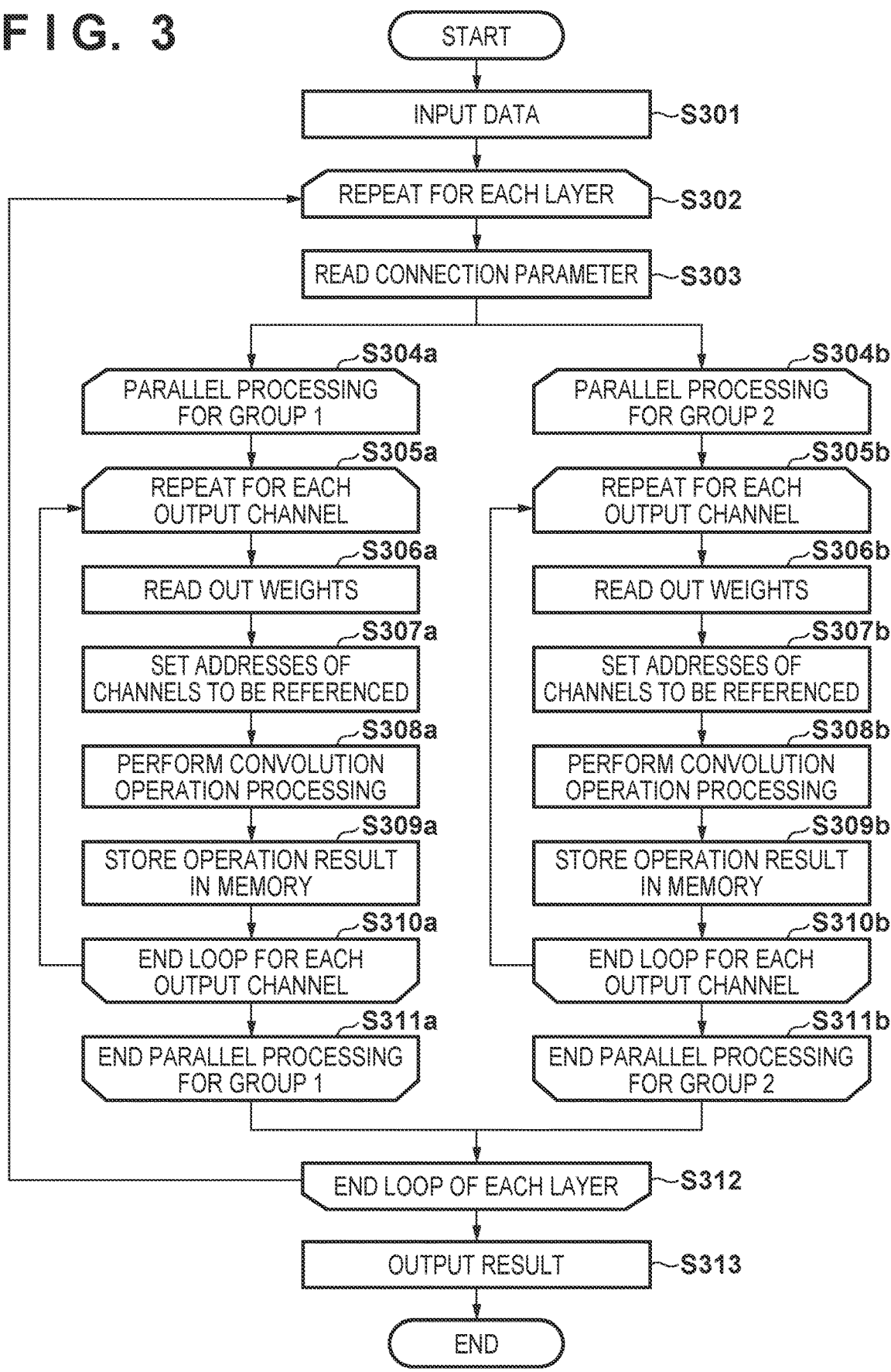

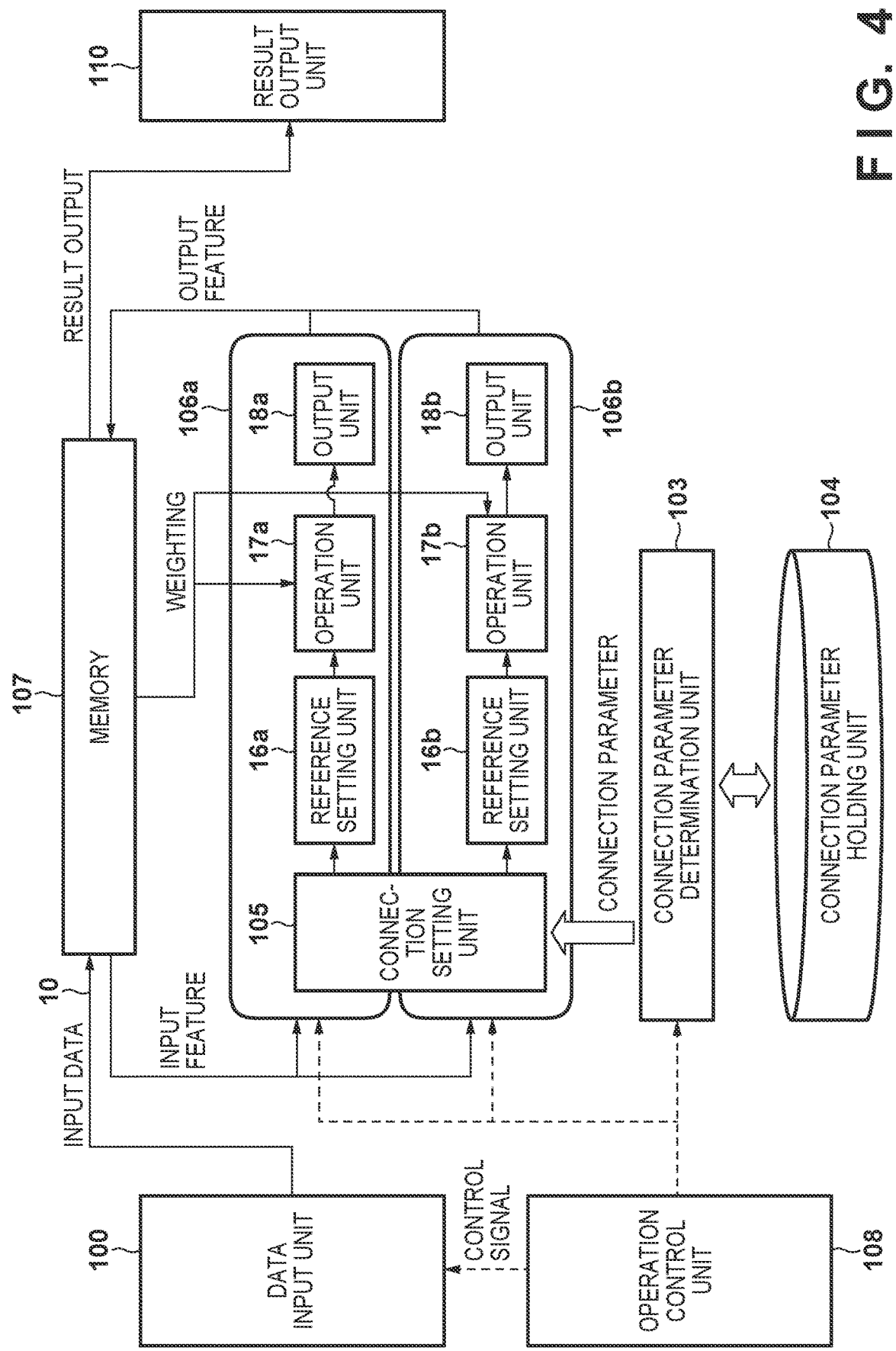

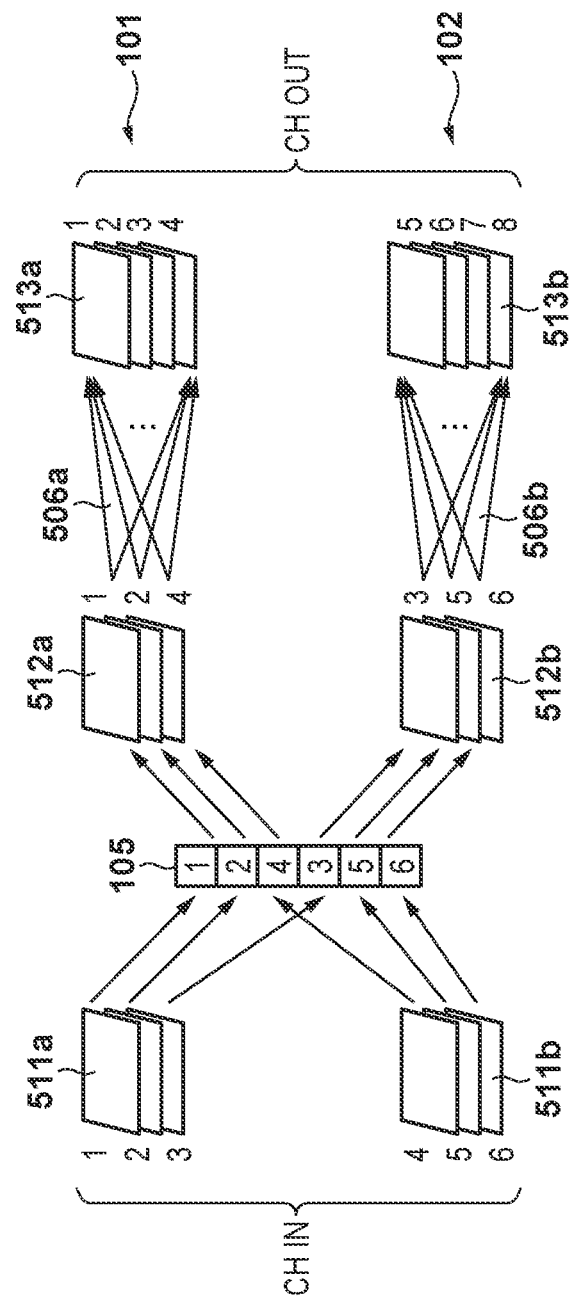

FIG. 6A
FIG. 6B
FIG. 6C

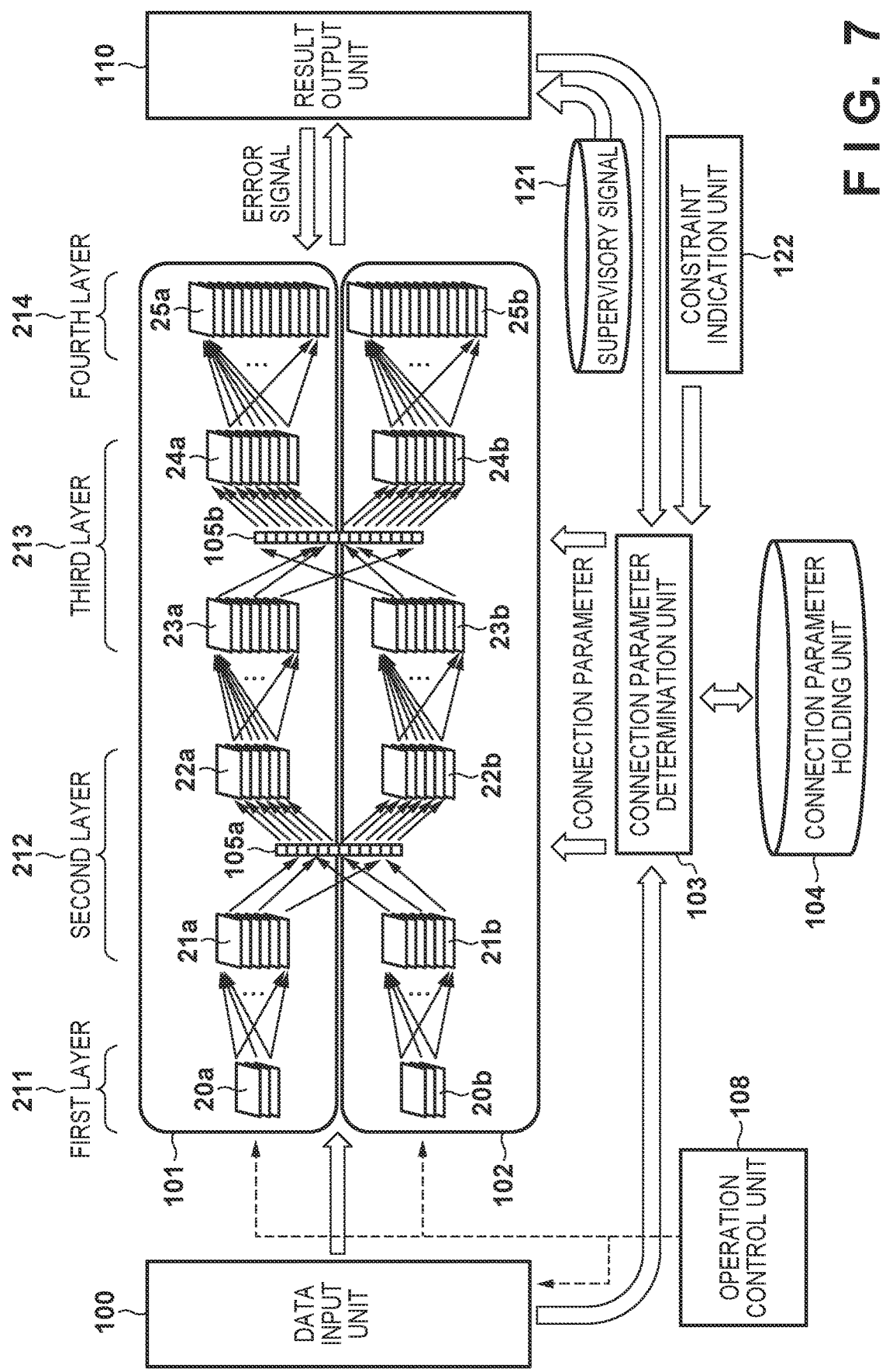

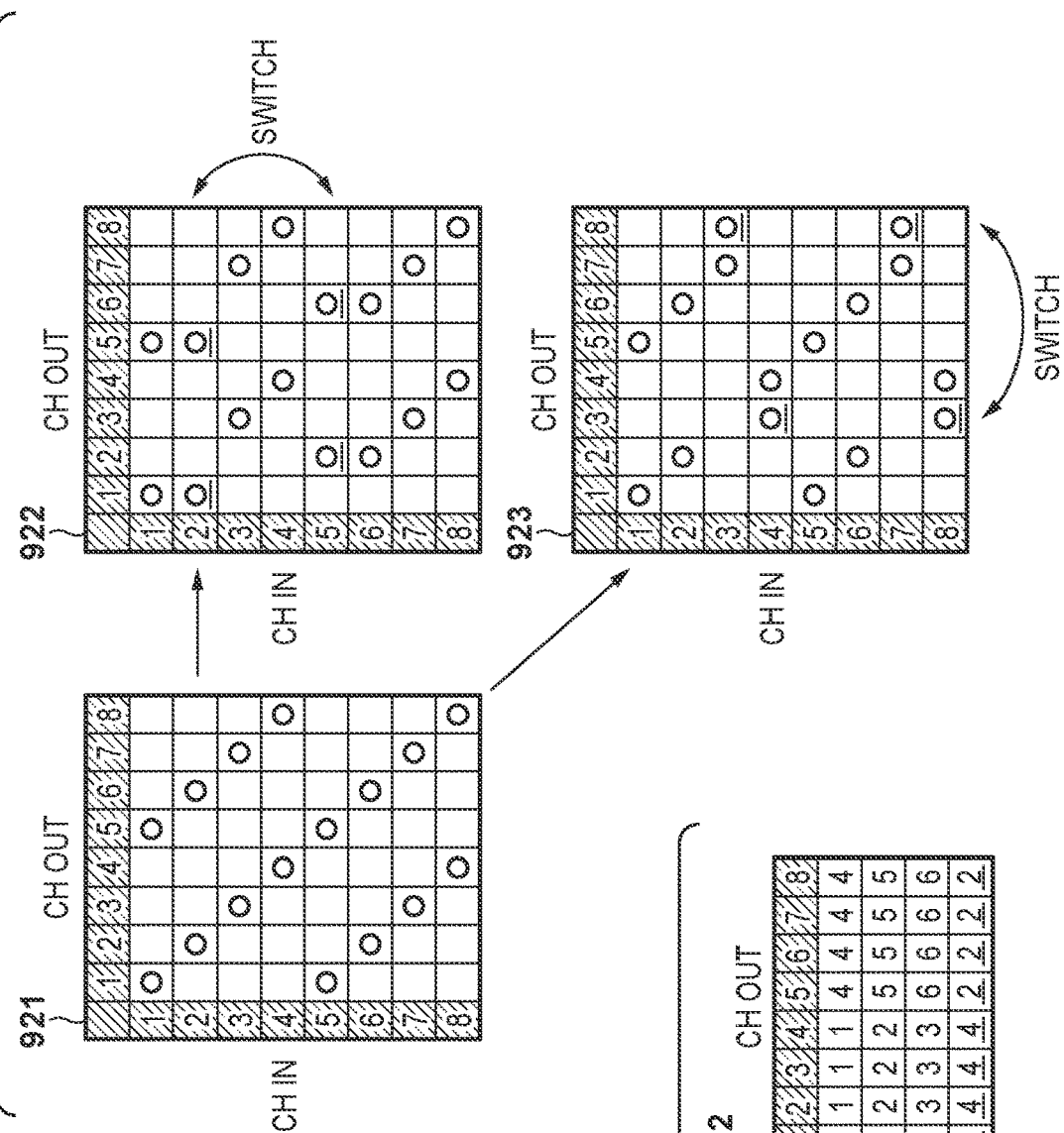
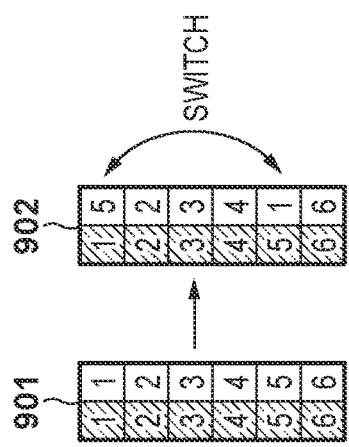
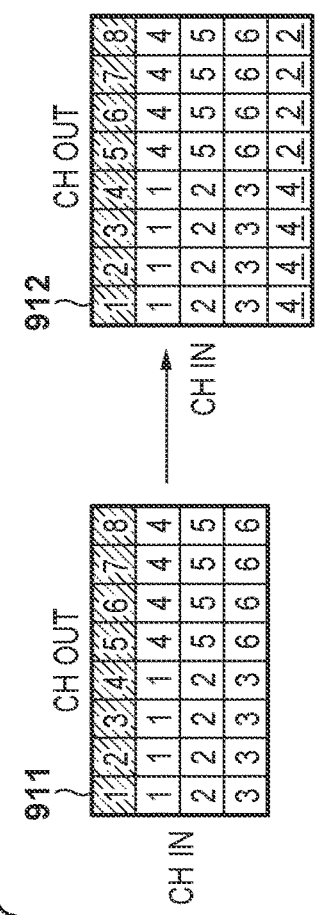
FIG. 9A
FIG. 9B
FIG. 9C

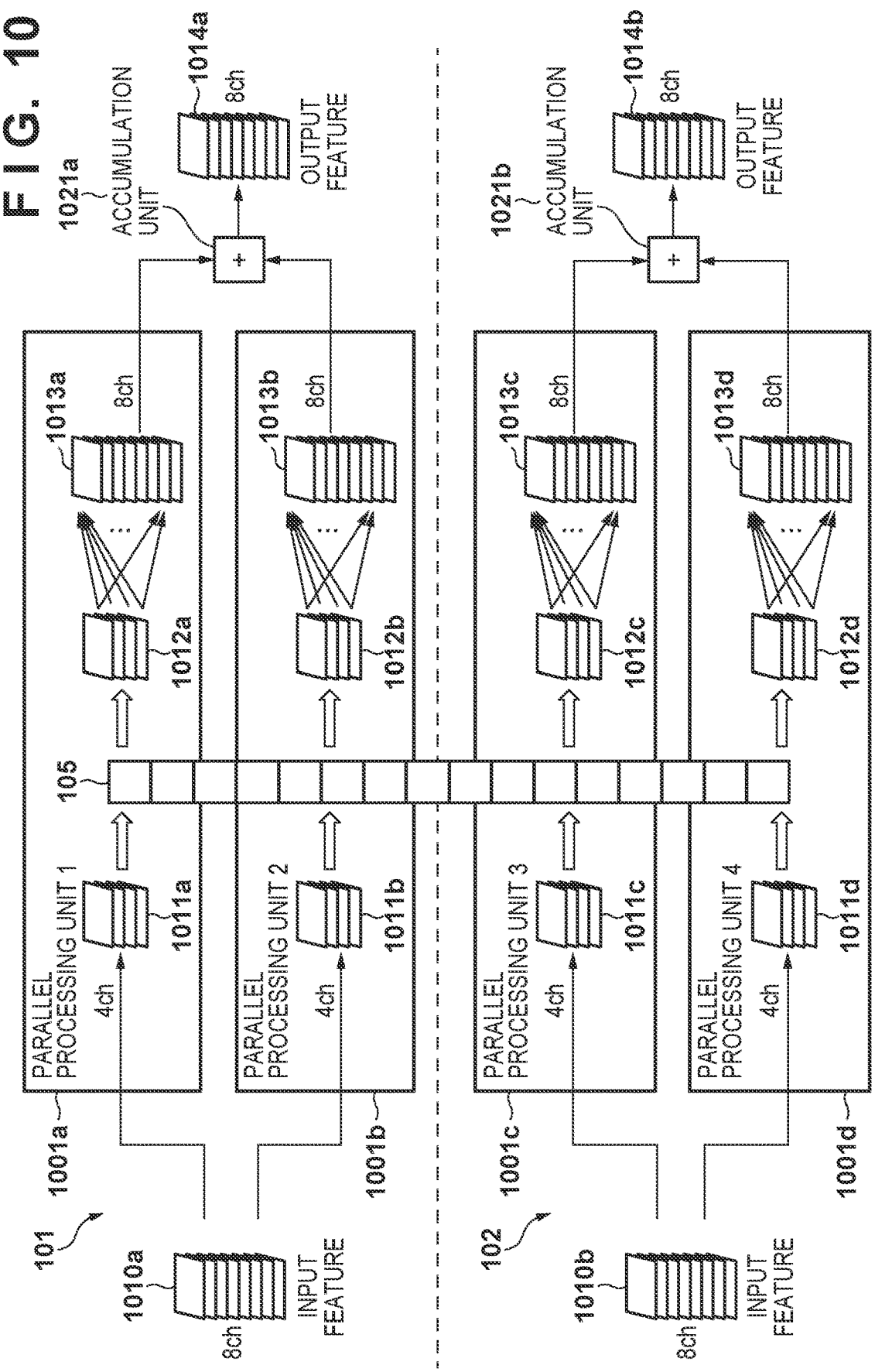

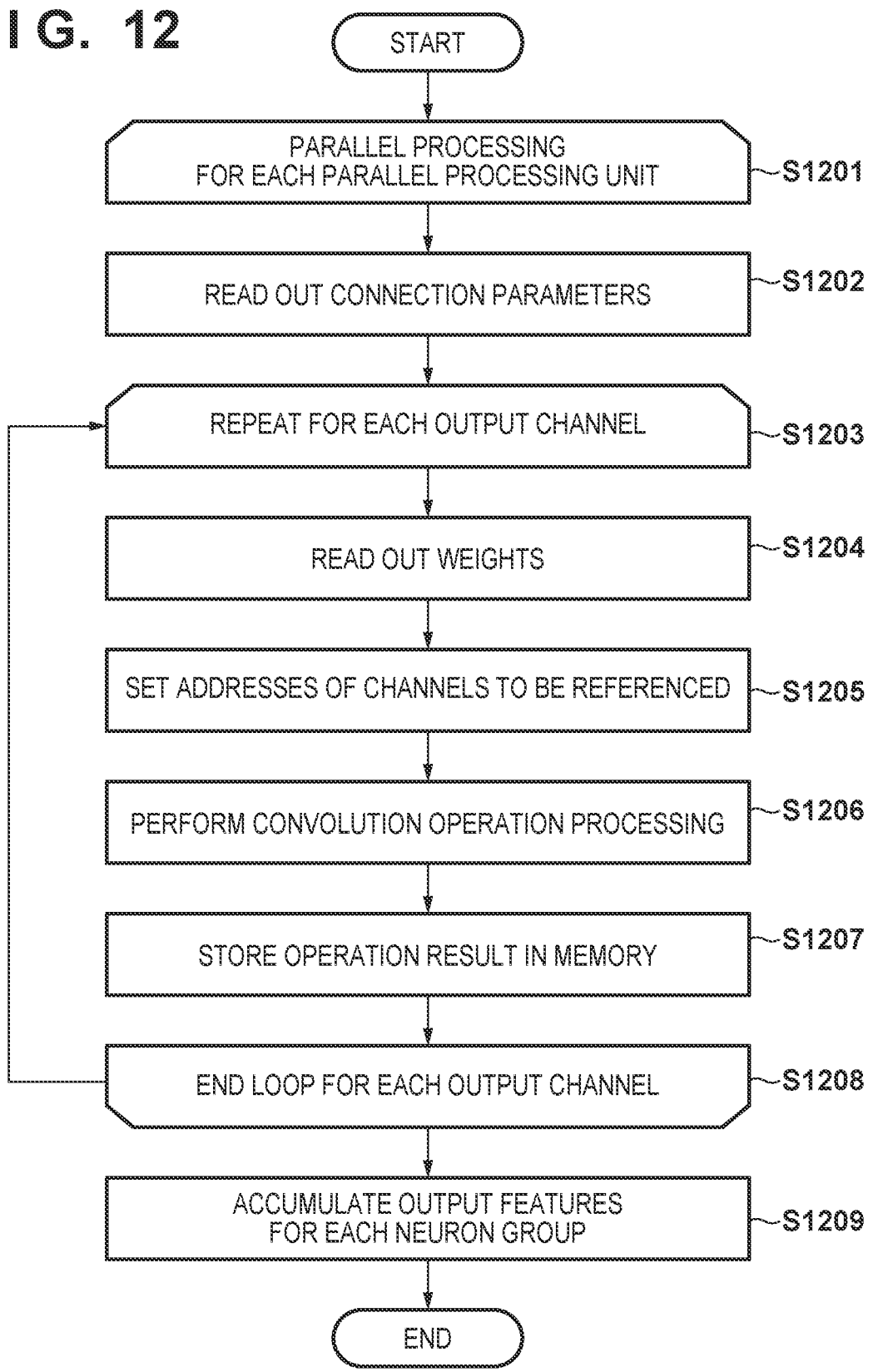

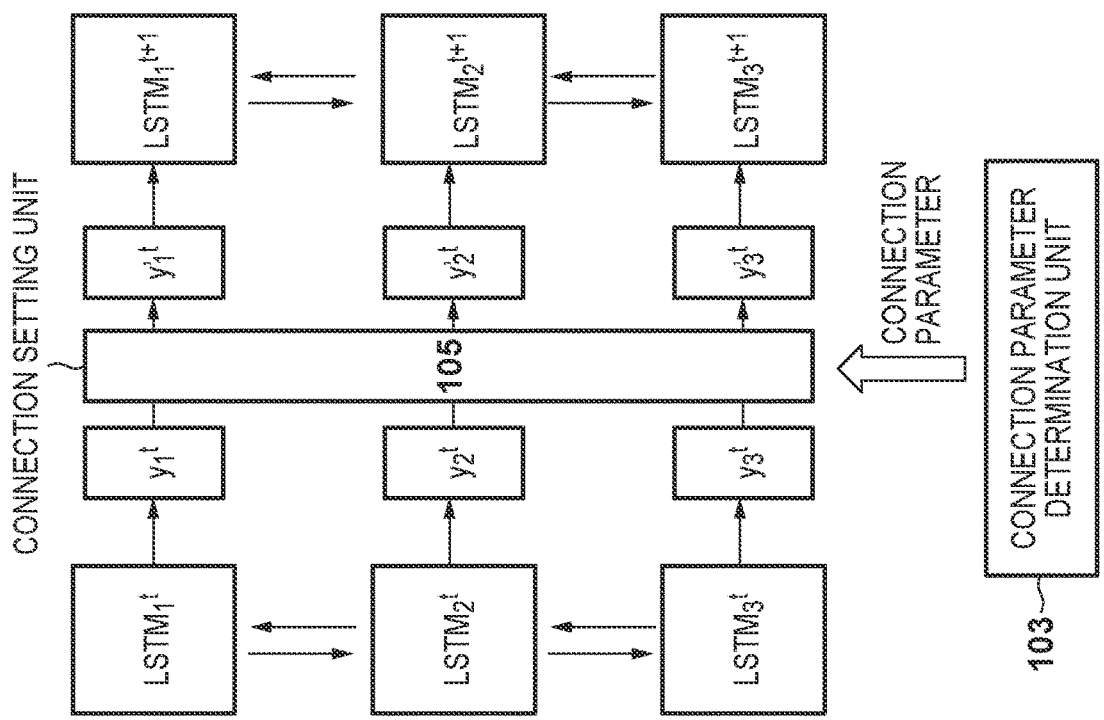
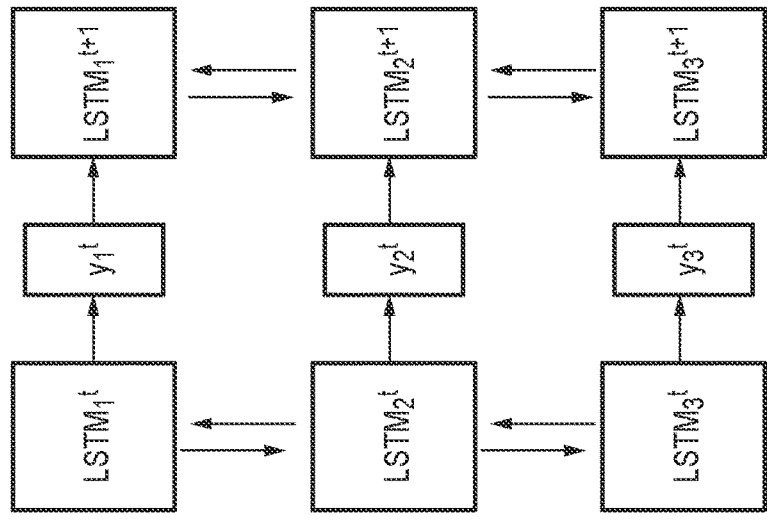
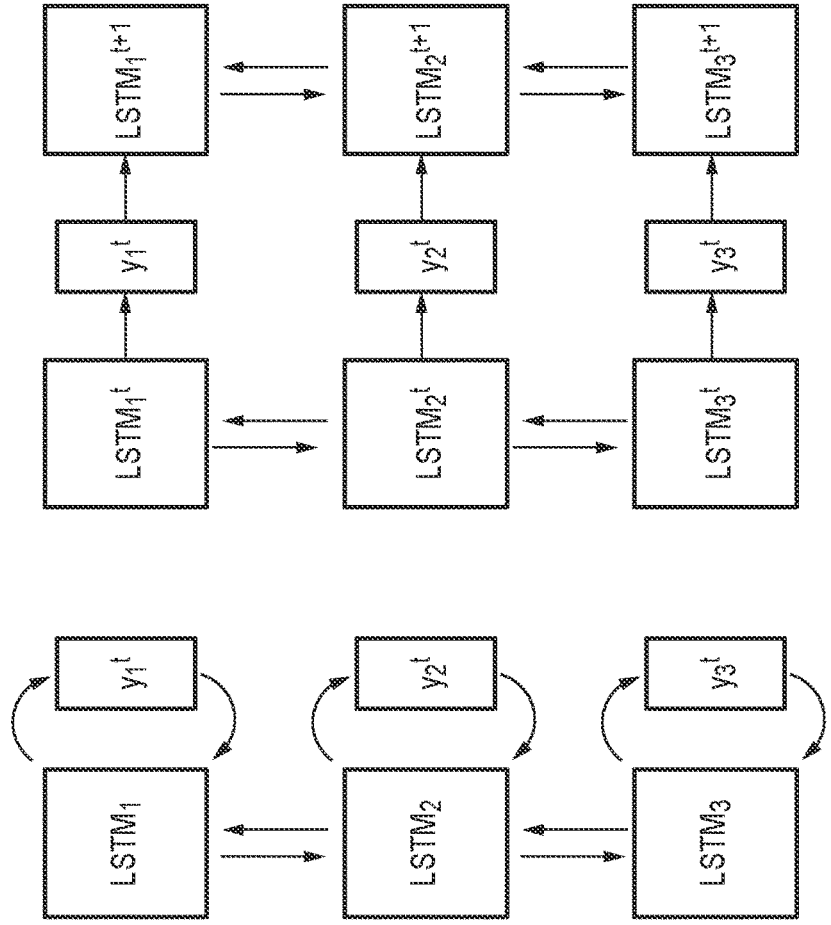

DATA PROCESSING APPARATUS, TRAINING APPARATUS, METHOD OF DETECTING AN OBJECT, METHOD OF TRAINING, AND MEDIUM

BACKGROUND OF THE INVENTION

Field of the Invention

The present invention relates to a data processing apparatus, a training apparatus, a method of detecting an object, a method of training, and a medium, and especially to reduction in processing costs for neural network operations.

Description of the Related Art

A neural network, such as a convolutional neural network (below CNN), has a plurality of layers, each layer comprising of a plurality of neurons. In a typical neural network, each neuron receives input signals from all neurons in the previous layer and sends signals to all neurons in the subsequent layer. Thus, the number of weighting coefficients between neurons is proportional to the square of the number of neurons.

In order to perform recognition processing using a neural network in real time, a sufficient processing speed is required. Also, in order to perform the processing using a neural network in various devices, there are cases in which it is necessary to reduce the amount of memory necessary for the processing. For these purposes, techniques are known for reducing the number of weighting coefficients between layers.

U.S. Pat. No. 9,811,775 discloses a method for parallelizing neural networks. U.S. Pat. No. 9,811,775, a plurality of parallel neural networks into which the same input image is input are used. Each parallel neural network has interconnected layers and non-interconnected layers. Output from an interconnected layer of one parallel neural network is inputted to all parallel neural networks, while output from a non-interconnected layer is inputted only to the same parallel neural network.

SUMMARY OF THE INVENTION

According to an embodiment of the present invention, a data processing apparatus for detecting an object from an image using a hierarchical neural network comprises: parallel first and second neural networks; an obtaining unit configured to obtain a table which defines different first and second portions, wherein the first portion comprises both a part of channels of a first layer of the first neural network and a part of channels of a first layer of the second neural network, both of the parts of channels being referenced in order to calculate feature data of a third portion of a second layer of the first neural network, and wherein the second portion comprises both a part of channels of the first layer of the first neural network and a part of channels of a first layer of the second neural network, both of the parts of channels being referenced in order to calculate feature data of a fourth portion of a second layer of the second neural network; and an operation unit configured to perform calculation of the feature data of the third portion based on feature data of the first portion identified using the table and on a weighting parameter between the first and second layers of the first neural network, and calculation of the feature data of the fourth portion based on feature data of the second portion identified using the table and on a weighting parameter between the first and second layers of the second neural network.

According to another embodiment of the present invention, a training apparatus operable to perform training of a hierarchical neural network comprises: an obtaining unit configured to obtain training data and supervisory data indicating processing results for the training data; a data processing unit configured to obtain a result of processing the training data by inputting the training data to the neural network, the data processing unit comprising an operation unit configured to, in accordance with a connection parameter defining a first portion of a first layer of the neural network to be referenced in order to calculate feature data of a third portion of a second layer of the neural network and defining a second portion of the first layer to be referenced in order to calculate feature data of a fourth portion of the second layer, calculate the feature data of the third portion of the second layer from feature data of the first portion of the first layer and calculate the feature data of the fourth portion of the second layer from feature data of the second portion of the first layer; and a training unit configured to perform training of the connection parameter and weighting coefficients between layers of the neural network based on a result of processing the training data, and the supervisory data.

According to still another embodiment of the present invention, a method of detecting an object from an image using a hierarchical neural network including parallel first and second neural networks comprises: obtaining a table which defines different first and second portions, wherein the first portion comprises both a part of channels of a first layer of the first neural network and a part of channels of a first layer of the second neural network, both of the parts of channels being referenced in order to calculate feature data of a third portion of a second layer of the first neural network, and wherein the second portion comprises both a part of channels of the first layer of the first neural network and a part of channels of a first layer of the second neural network, both of the parts of channels being referenced in order to calculate feature data of a fourth portion of a second layer of the second neural network; and performing calculation of the feature data of the third portion based on feature data of the first portion identified using the table and on a weighting parameter between the first and second layers of the first neural network, and calculation of the feature data of the fourth portion based on feature data of the second portion identified using the table and on a weighting parameter between the first and second layers of the second neural network.

According to yet another embodiment of the present invention, a method of training hierarchical neural network comprises: obtaining training data and supervisory data indicating processing results for the training data; obtaining a result of processing the training data by inputting the training data to the neural network, comprising, in accordance with a connection parameter defining a first portion of a first layer of the neural network to be referenced in order to calculate feature data of a third portion of a second layer of the neural network and defining a second portion of the first layer to be referenced in order to calculate feature data of a fourth portion of the second layer, calculating the feature data of the third portion of the second layer from feature data of the first portion of the first layer and calculating the feature data of the fourth portion of the second layer from feature data of the second portion of the first layer; and performing training of the connection parameter and weighting coefficients between layers of the neural network based on a result of processing the training data, and the supervisory data.

According to still yet another embodiment of the present invention, a non-transitory computer-readable medium stores a program which, when executed by a computer comprising a processor and a memory, causes the computer to perform a method of detecting an object from an image using a hierarchical neural network including parallel first and second neural networks comprising: obtaining a table which defines different first and second portions, wherein the first portion comprises both a part of channels of a first layer of the first neural network and a part of channels of a first layer of the second neural network, both of the parts of channels being referenced in order to calculate feature data of a third portion of a second layer of the first neural network, and wherein the second portion comprises both a part of channels of the first layer of the first neural network and a part of channels of a first layer of the second neural network, both of the parts of channels being referenced in order to calculate feature data of a fourth portion of a second layer of the second neural network; and performing calculation of the feature data of the third portion based on feature data of the first portion identified using the table and on a weighting parameter between the first and second layers of the first neural network, and calculation of the feature data of the fourth portion based on feature data of the second portion identified using the table and on a weighting parameter between the first and second layers of the second neural network.

According to yet still another embodiment of the present invention, a non-transitory computer-readable medium stores a program which, when executed by a computer comprising a processor and a memory, causes the computer to perform: obtaining training data and supervisory data indicating processing results for the training data; obtaining a result of processing the training data by inputting the training data to the neural network, comprising, in accordance with a connection parameter defining a first portion of a first layer of the neural network to be referenced in order to calculate feature data of a third portion of a second layer of the neural network and defining a second portion of the first layer to be referenced in order to calculate feature data of a fourth portion of the second layer, calculating the feature data of the third portion of the second layer from feature data of the first portion of the first layer and calculating the feature data of the fourth portion of the second layer from feature data of the second portion of the first layer; and performing training of the connection parameter and weighting coefficients between layers of the neural network based on a result of processing the training data, and the supervisory data.

Further features of the present invention will become apparent from the following description of exemplary embodiments (with reference to the attached drawings).

BRIEF DESCRIPTION OF THE DRAWINGS

FIG. 2 is a view illustrating a configuration of a neural network according to the embodiment.

FIG. 3 is a flowchart of a data processing method according to the embodiment.

FIG. 4 is a view illustrating a hardware configuration example of a data processing apparatus according to the embodiment.

FIG. 5 is a view illustrating an operation example of a connection setting unit 105.

FIGS. 6A to 6C are views illustrating examples of various connection parameters.

FIG. 7 is a view illustrating a basic function of a data processing apparatus according to the embodiment.

FIGS. 9A to 9C are views illustrating examples of a method of changing a connection parameter.

FIG. 10 is a view describing a processing method by a data processing apparatus according to the embodiment.

FIG. 12 is a flowchart of a data processing method according to the embodiment.

FIGS. 15A to 15C are views describing an example of application to a recursive neural network.

DESCRIPTION OF THE EMBODIMENTS

Figure 1:
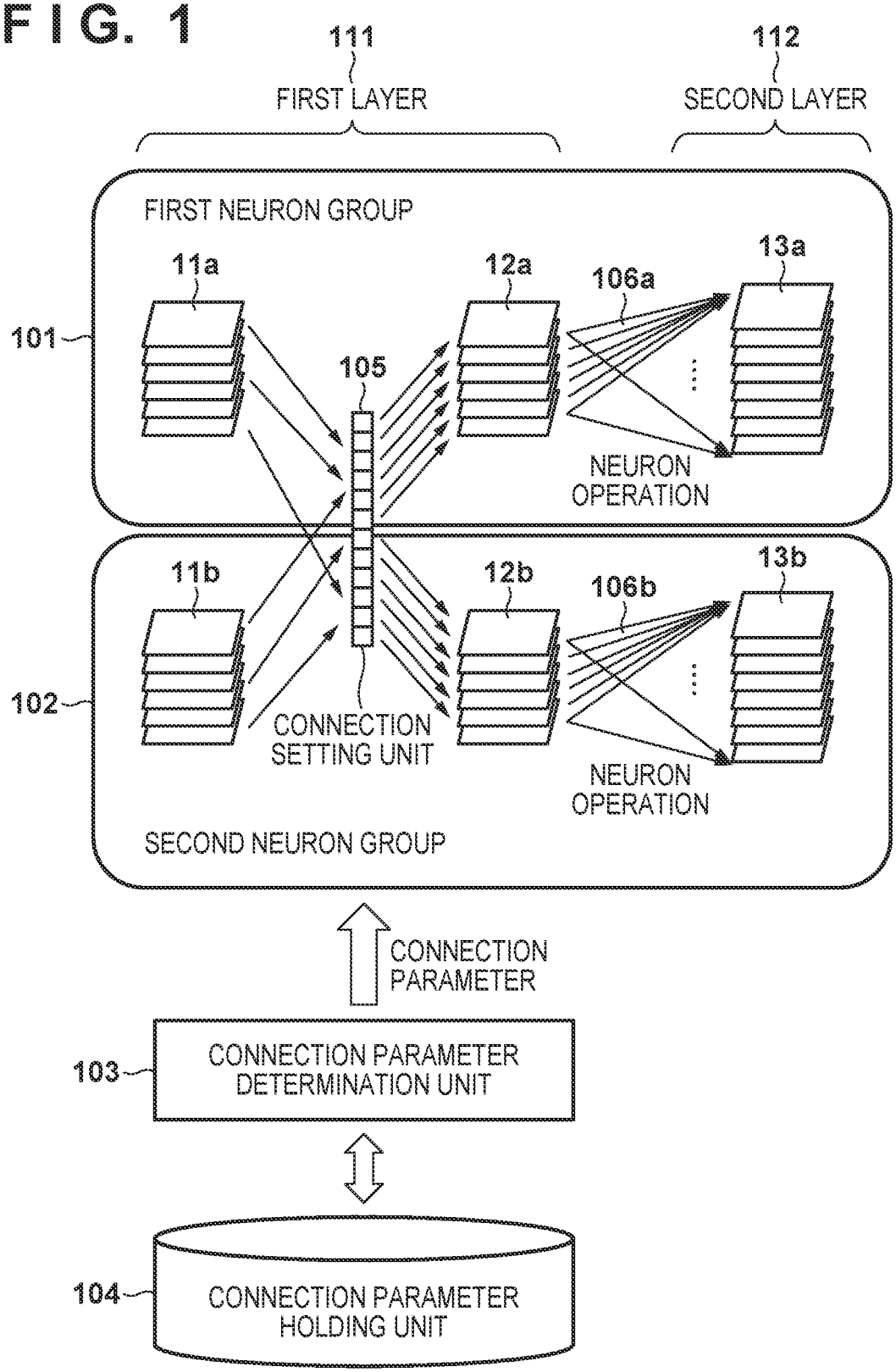
FIG. 1 is a view illustrating basic functions of a data processing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

By using non-interconnected layers as in U.S. Pat. No. 9,811,775, it is possible to reduce the number of weighting coefficients compared to a typical convolutional neural network in which the neurons in all layers are each connected to all neurons of the previous layer and the subsequent layer.

Meanwhile, it is thought that recognition accuracy using the neural network will be improved by combining features extracted by respective parallel neural networks. Therefore, it is thought that recognition accuracy will be improved by arranging interconnected layers at a later stage in the neural network. Here, in a general neural network such as a CNN, the number of neurons tends to be larger in subsequent layers. Thus, there is a problem that the effect of reducing the weighting coefficients will not be very significant if, according to the method of U.S. Pat. No. 9,811,775, interconnected layers are provided at a later stage of the neural network and non-interconnected layers are provided at an early stage.

One embodiment of the present invention enables a reduction in the number of weighting coefficients used in a neural network to increase the speed of processing according to the neural network or to reduce the amount of memory required for processing, for example.

Embodiment 1

First, an outline of processing according to the present embodiment will be described with reference to FIG. 1. The neural network according to the present embodiment is a hierarchical neural network, and includes a first layer 111 and a second layer 112. The first layer 111 and the second layer 112 each have a first neuron group 101 and a second neuron group 102. The first neuron group 101 is a group of neurons to be subjected to a neuron operation 106a. The second neuron group 102 is a group of neurons to be subjected to a neuron operation 106b. Here, the neuron operations 106a and 106b between the first layer 111 and the second layer 112 only connect between neurons in the same group of neurons. In the example of FIG. 1, neuron groups 101 and 102 are present across both the first layer 111 and the second layer 112. As described below, the neuron operations 106a and 106b may be performed by separate operation units (17a or 17b), respectively.

The neuron operations 106a and 106b are operations according to a neural network. The neuron operations 106a and 106b may be general processes in a neural network, such as convolution operation or activation function application. As types of specific operations, those in A. Krizhevsky et al. "ImageNet Classification with Deep Convolutional Neural Networks", NIPS 2012. (hereinafter referred to as Krizhevsky) and M. D. Zeiler, R. Fergus "Visualizing and Understanding Convolutional Networks", ECCV 2014. (hereinafter referred to as Zeiler) can be used as examples.

In the first neuron group 101 of the first layer 111, an input feature 11a and a referenced input feature 12a, which indicates a reference order of input features, are schematically shown. In the first neuron group 101 of the second layer 112, an output feature 13a is shown. Similarly, an input feature 11b and a referenced input feature 12b are shown in the second neuron group 102 of the first layer 111, and an output feature 13b is shown in the second neuron group 102 of the second layer 112. In the example of FIG. 1, the input feature 11a includes a plurality of feature channels (or feature planes), and each feature channel corresponds to one neuron. When performing an operation for a feature amount, a different filter (e.g., a filter of 2×2 pixels) is applied to each of the plurality of feature channels. The same applies to the input feature 11b, the referenced input features 12a and 12b, and the output features 13a and 13b.

The connection setting unit 105 sets a first portion used in the neuron operation 106a and a second portion used in the neuron operation 106b, with respect to the first layer 111. In the example of FIG. 1, the connection setting unit 105 sets the feature channels used in the neuron operations 106a and 106b. The connection setting unit 105 performs this setting according to a connection parameter. For example, the connection setting unit 105 may change the reference order of the input features 11a and 11b according to the connection parameter. The connection setting unit 105 can be realized by a register or the like for setting reference addresses of the input features 11a and 11b. In FIG. 1, the connection setting unit 105 is schematically illustrated as a unit that switches the order of the feature channels. The referenced input features 12a and 12b schematically show the input features 11a and 11b rearranged according to the reference order, and respectively correspond to a first portion used in the neuron operation 106a and a second portion used in the neuron operation 106b.

As described above, in the present embodiment, the neuron operation 106a calculates the output feature 13a (feature data of a third portion) of the second layer 112 from the referenced input feature 12a (the feature data of the first portion) of the first layer 111. The neuron operation 106b calculates the output feature 13b (feature data of a fourth portion) of the second layer 112 from the referenced input feature 12b (feature data of the second portion) of the first layer 111. In the example of FIG. 1, all feature channels (neurons) of the referenced input feature 12a and all feature channels (neurons) of the output feature 13a are connected together. Similarly, all feature channels of the output feature 13b and all feature channels of the referenced input feature 12b are connected together. As described above, the feature data of each channel included in the output feature 13a is calculated using the feature data of all channels included in the referenced input feature 12a and without using the feature data of the channel included in the referenced input feature 12b.

The connection parameter referred to by the connection setting unit 105 is stored in a connection parameter holding unit 104, and can be obtained from the connection parameter holding unit 104. In the example of FIG. 1, a connection parameter determination unit 103 can supply the connection parameter stored in the connection parameter holding unit 104 to the connection setting unit 105. This connection parameter defines a first portion (the referenced input feature 12a) of the first layer 111 that is referenced to calculate feature data of a third portion (the output feature 13a) of the second layer 112. Also, this connection parameter defines a second portion (the referenced input feature 12b) of the first layer 111 that is referenced to calculate feature data of a fourth portion (the output feature 13b) of the second layer 112. The connection parameter may further define a third portion (output feature 13a) and a fourth portion (output feature 13b) of the second layer 112.

On the other hand, in the present embodiment, the connection setting unit 105 determines the referenced input features 12a and 12b by changing the reference order of the input features 11a and 11b or rearranging the input features 11a and 11b. Thus, it can be said that the second layer 112 has the output feature 13a (a third set of neurons in the second layer) connected to a portion of the input feature 11a (a first set of neurons in the first layer) and a portion of the input feature 11b (a second set of neurons in the first layer). Also, it can be said that the second layer 112 has the output feature 13b (a fourth set of neurons in the second layer) connected to a portion of the input feature 11a (a first set of neurons in the first layer) and a portion of the input feature 11b (a second set of neurons in the first layer). Here, the input feature 11a (a first set of neurons of the first layer) may be connected to a first set of neurons of a previous layer to the first layer. Here, the input feature 11b (a second set of neurons of the first layer 111) may be connected to a second set of neurons of a previous layer to the first layer 111. These previous layers, the first layer, and the second layer are included in the neural network and are connected in order. In the present specification, a set of neurons refers to a subset of a plurality of neurons in one layer.

As described above, in the present embodiment, the connection setting unit 105 exchanges input/output signals between neuron groups. The configuration of FIG. 1 is equivalent to setting the referenced input feature 12a and the referenced input feature 12b by switching feature data between the input feature 11a and the input feature 11b.

Although FIG. 1 shows a structure of two layers of a neural network, the processing according to the present embodiment can be applied to a larger neural network as shown in FIG. 2. In FIG. 2, a four-layer multilayer CNN is shown, wherein the neuron operations between layers include convolution operations. Also shown in FIG. 2 is a data input unit 100 for inputting data to the neural network. The type of data to be processed by the neural network according to the present embodiment is not particularly limited, and may be, for example, voice, a still image, a moving image, a sentence, or the like. In the example of FIG. 2, a three-channel color still image is input as input data 20. Hereinafter, "channel" may be abbreviated as "ch".

FIG. 2 further shows a result output unit 110 for outputting a processing result based on an operation result outputted from the neural network. The form of the processing result differs depending on the task to be processed by the neural network. For example, if semantic segmentation is performed, the processing result may be a likelihood map having C channels indicating the likelihood for each of the C classes for each pixel in the input image. When classification is performed, the processing result may be a likelihood for each of C classification categories.

In FIG. 2, three neuron operations 106-1a/106-1b, 106-2a/106-2b, and 106-3a/106-3b, and two processes by the connection setting unit 105 are shown between the first layer 211 and the fourth layer 214. In FIG. 2, there are two neuron groups, neuron group 101 and neuron group 102, and there is no connection by a neuron operation between the neuron groups. The neural network is divided into two neuron groups from the input layer to the final layer. Meanwhile, the connection setting unit 105 changes the reference order of input and output of neurons across neuron groups. Thus, input and output signals of neurons can be exchanged between the two neuron groups.

Next, a data processing apparatus that performs processing according to the neural network according to the present embodiment will be described with reference to FIG. 3 and FIG. 4. FIG. 4 shows a hardware configuration example of an IP, for example, which is a data processing apparatus according to the present embodiment, in which a neural network is used for recognition processing. FIG. 4 shows an operation flow of the data processing apparatus when the recognition processing is performed using the neural network. It is assumed that the weighting parameters of the convolution operation between the layers of the CNN have already been obtained by training. The connection parameter holding unit 104 stores the connection parameter in advance. The method of determining the connection parameter will be described later.

When the operation of the data processing apparatus is started, the operation control unit 108 sends control signals to the data input unit 100 in step S301. In response to the control signals, the data input unit 100 receives the input data 10 and stores it as an input feature in the memory 107. The data input unit 100 can receive the input data 10 from, for example, an imaging device or the like. In the following example, it is assumed that the input data 10 is a multichannel image feature, in particular it is a 6-channel multispectral image.

Next, in the loop processing of steps S302 to S312, the information processing apparatus performs the processing of the first layer of the neural network on the input feature in the memory 107. In the example of FIG. 2, the feature data 21a and 21b are calculated using the input data 20.

First, in step S303, the connection setting unit 105 reads, from the connection parameter holding unit 104 via the connection parameter determination unit 103, a connection parameter indicating a connection relationship with respect to the layer currently being processed. In the present embodiment, the connection parameter holding unit 104 stores a table indicating the connection parameter.

Figures 6A, 6B, 6C:
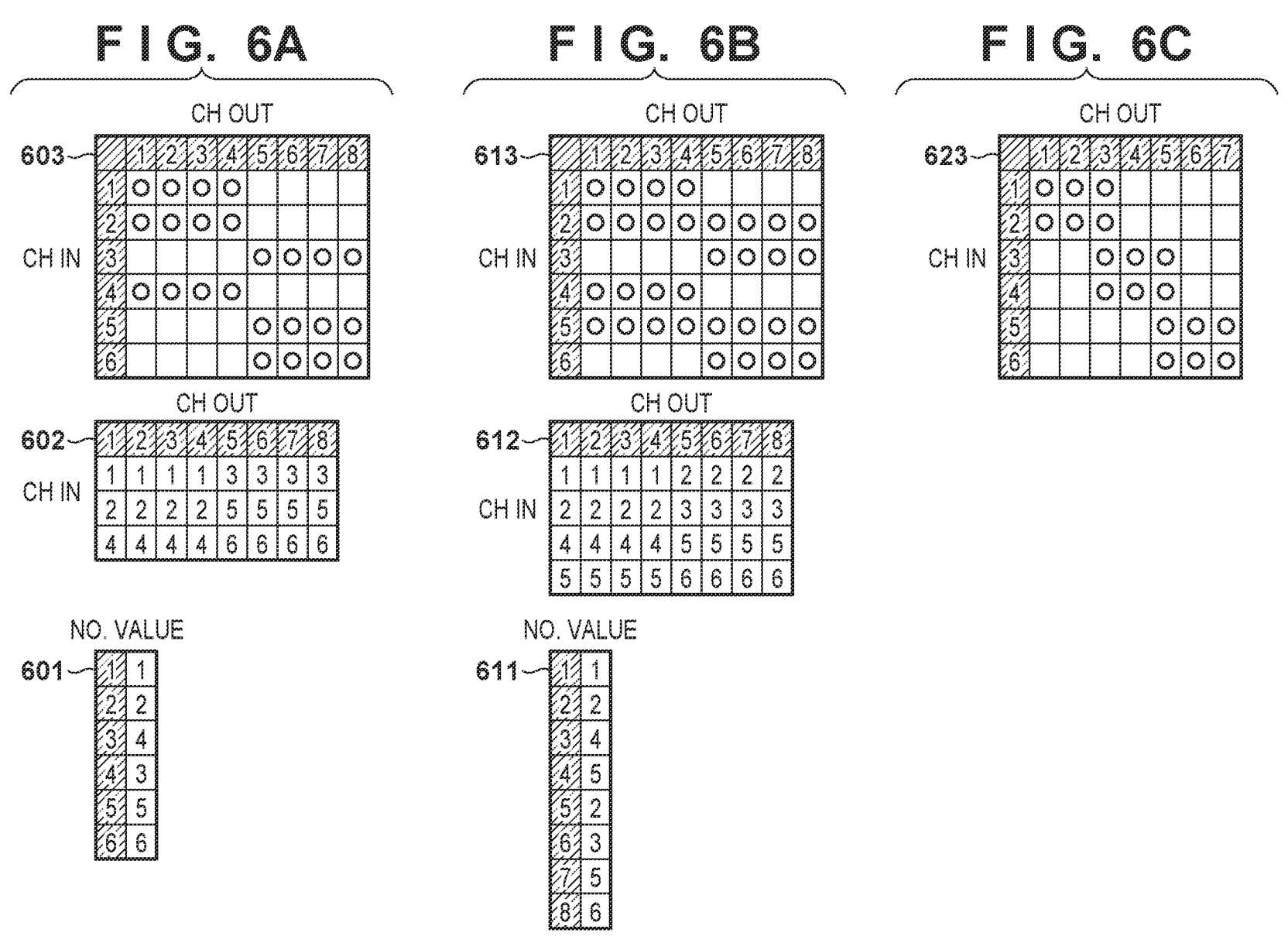

FIG. 6A shows examples of such tables. FIG. 5 shows the operation of the connection setting unit 105 according to the table 601 shown in FIG. 6A. The table 601 shown in FIG. 6A specifies the referenced input feature 512a and the referenced input feature 512b in units of channels. That is, the table 601 has six values indicating the reference order for each six-channel input feature. Hereinafter, such a table is referred to as an order specification table. This order specification table can specify a different order for each of an object type of an object which the data processing apparatus recognizes or detects from an image using the neural network. The data processing apparatus can, upon receiving an instruction to specify the object type of the object to detect, obtain an order specification table corresponding to the object specified in the instruction, reference a feature channel based on the order specification table, and perform operation processing. The type of the object may, for example, a human, a face, a head, a body, a fruit, a vehicle, traffic signs, a building, an object on roads, or a machine part.

In steps to be described later, as shown in FIG. 5, the operation units 17a and 17b reference the feature channels in accordance with the order specified by the order specification table, and perform operation processing. In the example of FIG. 6A, for the first neuron group 101, the output feature 513a is calculated by convolution operation on the referenced input feature 512a corresponding to the three channels of the input feature [channel 1, channel 2, channel 4]. Also, for the second neuron group 102, the output feature 513b is calculated by convolution operation on the referenced input feature 512b corresponding to the three channels of the input feature [channel 3, channel 5, channel 6]. That is, the referenced input feature 512a used for a neuron operation 506a for the first neuron group 101 is set out of the input features 511a and 511b according to the connection parameter. Also set is the referenced input feature 512b that is similarly used for the neuron operation 506b.

The processes of steps S304 to S311 are performed in parallel for each of the neuron groups 101 and 102. Hereinafter, steps S304a to S311a, which is processing for the neuron group 101, will be described, but steps S304b to S311b, which is processing for the neuron group 102, is also performed in the same manner.

The feature data is calculated for each channel of the output channels by the loop processing of steps S305a to S310a. By performing such loop processing a predetermined number of times (N times), an N-channel output feature is generated.

In step S306a, the operation unit 17a reads the weighting coefficients of the convolution operation (also referred to as convolution kernels) from the memory 107. The operation unit 17a sets the read parameters in a register area (not shown) in the operation unit 17.

In step S307a, the reference setting unit 16a sets the input feature addresses used in the convolution operation in a register area (not shown) of the operation unit 17a. The reference setting unit 16a sets the addresses so that specified channels of the input feature in the memory 107 are referenced in the order indicated by the order specification table read in step S303a.

In step S308a, the operation unit 17a obtains the input features located at the addresses set in step S307a from the memory 107. Then, the operation unit 17a, for the obtained input features, performs a convolution operation using the weighting coefficients set in step S306a.

The operation unit 17a can perform a convolution operation according to the following equation (1).

$$F^{OUT}_j(x,y)=b_j+\Sigma_i \Sigma_{\Delta x} \Sigma_{\Delta y} W_{ij}(\Delta x, \Delta y) F^{IN}_{LUT(i)}(x+\Delta x, y+\Delta y) \quad (1)$$

In this equation, $F^{IN}$ and $F^{OUT}$ represent the input feature and the output feature, and in this example, both of the input feature and the output features are three-dimensional feature data having vertical×horizontal×channel directions.

$F^{IN}_k$ represents the kth channel of the input feature $F^{IN}$, and $F^{OUT}_j$ represents the jth channel of the output feature $F^{OUT}$. LUT(i) indicates the number of the channel of the input feature corresponding to the number of the channel of the i-th referenced input feature which is the target of the convolution operation. For example, in the example of FIG. 5, the neuron operation 506a uses [channel 1, channel 2, channel 3] of referenced input feature 512a, which corresponds to the three channels of [channel 1, channel 2, channel 4] of input feature 511a. That is, when i=[1, 2, 3], LUT(i) represents [1, 2, 4]. $b_j$ is a bias term. $W_{ij}$ is a weighting coefficient, which indicates the connection weight between neuron i of the previous layer and neuron j of the subsequent layer. Δx, Δy (Δx, Δy ∈ [−1, 0, 1]) is a variable indicating the convolution range.

Also, the operation unit 17a can further perform an activation operation on the results of the convolution operation. The operation unit 17a can perform an activation operation according to the following equation (2).

$$F^{OUT}_j(x,y) = \theta(F^{OUT}_j(x,y)) \quad (2)$$

$$\theta(x) = \text{Max}(0,x)$$

In this equation, θ is a non-linear function called an activation function. The operation unit 17a can also perform other operations used in the CNN, such as operation processing called maximum value pooling and a fully-connected layer operation.

In step S309a, the output unit 18 stores the output features for one channel obtained in step S308a in a predetermined position in the memory 107. By the above process, $F^{OUT}_j$, which is feature data of the jth channel of the output feature, is generated in the memory 107.

By repeating the process of the above-described steps S304a to step S311a a predetermined number of times (N times), feature data of the N channels of the output feature of the first neuron group 101 is generated in the memory 107. By repeating the process of the above-described step S304a to step S311a a predetermined number of times (N times) in parallel, feature data of the N channels of the output feature of the second neuron group 102 is generated in the memory 107. By this processing, the operation processing of one layer of the neural network is completed.

In this way, by repeating the loop from step S302 to step S312 several times, a similar process is performed on all layers of the neural network. By the time the loop ends, the output features of the final layer have been generated in memory 107. In step S313, the result output unit 110 outputs the output features of the final layer in the memory 107. The output features thus output are the result of processing on the input data 10 by the neural network. Based on the processing result obtained in this way, various recognition processing such as classification processing can be performed. The result output unit 110 may perform recognition processing such as classification processing using the processing result and output the recognition result. Thus, the recognition operation using the neural network ends.

The data format of the connection parameter is not limited to the order specification table 601 in FIG. 6A. For example, the connection parameter may be represented by a connection table 603 or a connection list 602 as illustrated in FIG. 6A. In FIG. 6A, the order specification table 601, the connection list 602, and the connection table 603 all indicate the same connection relationship. The connection table 603 represents the presence or absence of a connection between an input feature channel and an output feature channel. The symbol ○ indicates that there is a connection between the channels. FIG. 6A indicates that the input features [channel 1, channel 2, channel 4] are respectively connected to each of the output features [channel 1, channel 2, channel 3, channel 4]. FIG. 6A also indicates that the neuron groups of the subsequent layer are divided into two groups: channel 1 to channel 4 and channel 5 to channel 8. The connection list 602 indicates, for each channel of the output feature, the number of channels of the connected input feature.

In the example of FIG. 6A, a change in the order of the channels of the input features corresponds to the referenced input features. For this reason, each input feature channel is referenced once and used for the convolution operation. That is, the connection setting unit 105 sets a first portion and a second portion for the first layer according to the connection parameter, but in this case, the first portion and the second portion do not overlap. On the other hand, as shown in FIG. 6B, one input feature channel may be referred to by a plurality of neuron groups of the subsequent layer. That is, the first portion and the second portion may partially overlap each other. In the example of FIG. 6B, channel 2 and channel 5 of the input feature are referenced from both the first neuron group (output feature channel 1 to channel 4 are calculated) and the second neuron group (output feature channel 5 to channel 8 are calculated). In FIG. 6B, an order specification table 611, a connection list 612, and a connection table 613 all indicate the same connection relationship. As described above, the setting of the method for referencing a input feature is not limited to changing the order, and various connection relationships can be set.

In the above example, there are two neuron groups. However, the number of neuron groups is not limited to two. The neurons of each layer may be divided into any n groups.

In the above example, although the input data 20 is 6-channel data, the configuration of the number of channels and the like of the input data is not particularly limited. In the first layer, convolution processing may be performed in a similar manner to a normal CNN, and neurons may be divided into a plurality of neuron groups from the second layer. The feature data 20a and 20b may be the same input data 20. For example, the reference addresses of the feature data 20a and 20b can be the same address where the input data 20 is stored. In this way, parallel processing may be performed for two neuron groups to which the same input data 20 is input from the first layer. These configurations may be applied to input data with a small number of channels, such as channel 3-channel RGB still image data.

According to this embodiment, a first portion of a first layer (e.g., the referenced input feature 12a) and a third portion of a second layer (e.g., the output feature 13a) are connected. Also, a second portion of a first layer (e.g., the referenced input feature 12b) and a fourth portion of a second layer (e.g., the output feature 13b) are connected. On the other hand, since a connection between the first portion of the first layer and the fourth portion of the second layer is omitted, the operation amount of the convolution operation corresponding to the connection and the memory amount for holding weighting coefficients can be reduced. Meanwhile, unlike the case where a non-interconnected layer is provided as in U.S. Pat. No. 9,811,775, the connection between neuron groups is maintained, and therefore it is expected that deterioration in recognition accuracy will be suppressed.

Further, according to the present embodiment, the neuron operations of the respective neuron groups can be performed in parallel using the same operation. For example, in the example of FIG. 4, the configuration for the neuron operation 106a (the reference setting unit 16a, the operation unit 17a, and the output unit 18a) and the configuration for the neuron operation 106b (the reference setting unit 16b, the operation unit 17b, and the output unit 18b) are the same. That is, the data processing apparatus according to the present embodiment has an operation unit 17a (first processing unit) and the operation unit 17b (second processing unit) which operate in parallel. The operation unit 17a can calculate the output feature 13a from the referenced input feature 12a by the neuron operation 106a. The operation unit 17b can calculate the output feature 13b from the referenced input feature 12b by the neuron operation 106b.

Furthermore, according to the present embodiment, neuron operations using different connection relationships can be realized by using the same configuration. For example, in the example of FIG. 2, by using the connection parameter read by the connection setting unit 105, the neuron operation for calculating the third layer 213 and the fourth layer 214 can be performed in accordance with different connection relationships. In the neuron operation for calculating the second layer 212, the feature data 21a is calculated from the feature data 20a, and the feature data 21b is calculated from the feature data 20b. The connection parameter may thus also indicate a connection relationship in which there is no connection between neuron groups. Furthermore, a connection parameter for some layers may indicate that all channels of the previous layer and all channels of the subsequent layer are connected with each other. By virtue of such a configuration, compared to the case where the interconnected layer and the non-interconnected layer are mixed as in U.S. Pat. No. 9,811,775, the circuit scale of the operational hardware can be reduced, and the efficiency of the parallel processing can be improved.

In the example of FIG. 2, the two neuron groups are exclusive groups and one neuron was included in either of the two neuron groups. Such a configuration facilitates parallel processing, but the configuration of neuron groups is not limited to such a form. For example, neuron groups may overlap each other. For example, the connection table 623 shown in the FIG. 6C indicates that the neuron group for the output feature includes three groups, i.e., channel 1 to channel 3, channel 3 to channel 5, and channel 5 to channel 7. In this example, channel 3 and channel 5 are included in a plurality of neuron groups. In this manner, a connection parameter that indicates various connection relationships can be designed.

The application target of the present embodiment is not limited to a neural network of a specific type. For example, the present embodiment is applicable to various types of neural networks, such as a recursive neural network (refer to Recursive Neural Network, Byeon et al. "Scene labeling with LSTM recurrent neural networks," CVPR 2015. (hereinafter "Byeon")) or auto-encoders.

Second Embodiment

Hereinafter, a method for determining the connection parameter of the neural network described in the first embodiment will be described. A training apparatus according to the second embodiment can perform training of a neural network. The training apparatus according to the second embodiment can train the weighting coefficients of the neural network by using a normal machine training method. Furthermore, the training apparatus according to the second embodiment can also determine the connection parameter. The training apparatus can perform training for each of an object type to determine a different connection parameter for each of the object type.

The training method in the present embodiment will be outlined. For training, training data and supervisory data indicating a result of processing the training data are used. As described in the first embodiment, when training data is input to a neural network that performs processing in accordance with a predetermined connection parameter, a result of processing the training data is obtained. Then, training of the connection parameter and the weighting coefficients between the layers of the neural network is performed based on the connection parameter, the result of processing the training data, and the supervisory data. One example of a specific connection parameter training method is a method of searching for a connection parameter by which the performance of the neural network is improved by imparting a perturbative change on the connection parameter during the training. For example, it is possible to repeat a step of adopting a change to the connection parameter that improves the performance of the entire neural network is improved.

Hereinafter, the present embodiment will be described with reference to FIG. 7 and FIG. 8. FIG. 7 shows an example of the functional configuration of the training apparatus according to the present embodiment. The training apparatus illustrated in FIG. 7 is the same as that of the first embodiment except that the training apparatus includes a supervisory signal provision unit 121 and a constraint indication unit 122. The first neuron group 101 and the second neuron group 102 illustrated in FIG. 7 can also be realized by using the connection setting unit 105, the reference setting units 16a and 16b, the operation units 17a and 17b, and the output units 18a and 18b illustrated in FIG. 4.

The data input unit 100 obtains the training data and inputs it to the neural network through the memory 107. In addition, the supervisory signal provision unit 121 obtains supervisory data indicating a result of processing the training data, and inputs the supervisory data to the result output unit 110. The supervisory data is a target value for the result to be outputted by the neural network with respect to the training data. Such supervisory data may be prepared in advance. Hereinafter, a signal indicating the supervisory data is referred to as a supervisory signal.

The constraint indication unit 122 instructs a constraint condition for the neural network obtained by training. The constraint may include, for example, the number of layers of the neural network. The constraint may also include constraints on the connection parameters obtained by training, such as, for example, the number of neuron groups in each layer. Further, the constraint indication unit 122 can instruct a parameter used at the time of training by the training apparatus, such as a parameter $\tau$ for determining the magnitude of the perturbation. These constraints and parameters can be specified by the user, and the constraint indication unit 122 can obtain user input indicating such constraints. For items that are not specified by the user, the constraint indication unit 122 can use a default value.

Figure 8:
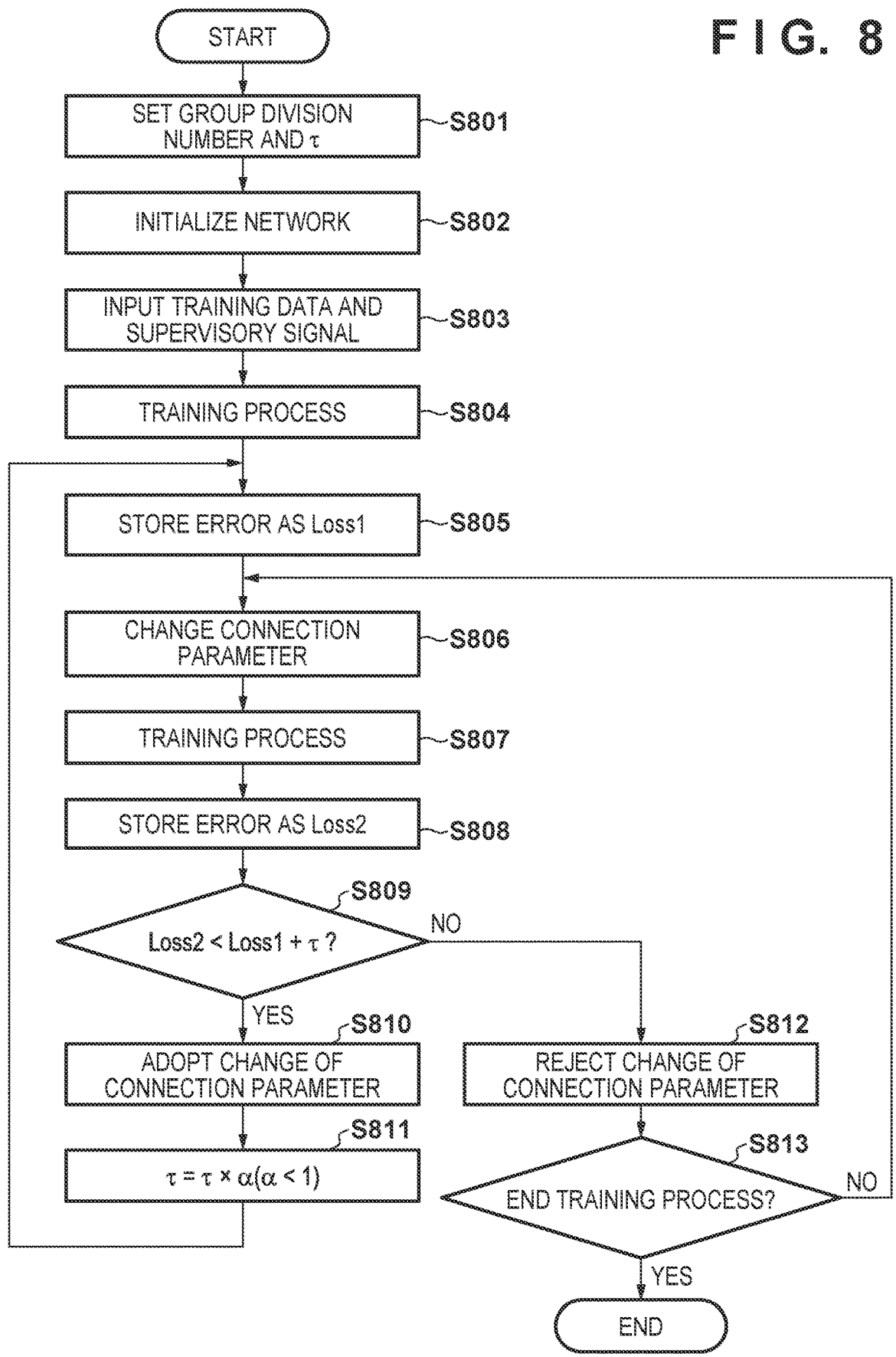
FIG. 8 is a flowchart of a training method according to the embodiment.

FIG. 8 is an example of a flowchart of the training process according to the present embodiment. When the training process starts, the constraint indication unit 122 obtains the user input representing the constraint information and parameter in step S801.

In step S802, the operation control unit 108 initializes all of the weighting coefficients for the neural network having a configuration according to the user input obtained in step S801. As an initial value of the weighting coefficients, random number values can be used. The connection parameter determination unit 103 initializes the connection parameter. In the present embodiment, an order specification table 601 as shown in FIG. 6A is used to indicate the connection parameter. As the initial value of the connection parameter, a state in which the order is not changed, such as the order specification table 901 in FIG. 9A, can be used.

In step S803, the data input unit 100 inputs a plurality of training images to the neural network through the memory 107. Further, the supervisory signal provision unit 121 inputs a supervisory signal corresponding to each of a plurality of training images to the result output unit 110. Thus, a plurality of training images can be used for training the neural network.

In step S804, the operation control unit 108 performs a process using a neural network in the same manner as in the first embodiment. That is, the connection setting unit 105 sets the channels of the input feature referred to in the neuron operations according to the connection parameter. Then, the neuron operation of each layer is performed in accordance with such setting. In this way, a result of processing by the neural network for each training image is obtained.

When the processing using the neural network is completed, the result output unit 110 compares the processing result with the supervisory signal. Then, the result output unit 110 generates an error signal indicating the comparison result, and by inputting the error signal to the neural network, the result output unit 110 can perform training of the weighting coefficients of the neural network. Known methods can be used to train the weighting coefficients of the neural network. For example, the method for calculating the error is not particularly limited, and the method described in Krizhevsky or Zeiler or the like can be used. As a specific example, the error can be calculated by using a loss function such as cross entropy in accordance with the training task. Further, by using a back propagation method based on error calculated in this way, for example, it is possible to perform training of the weighting coefficients of the neural network.

In step S804, a training step including processing of a plurality of training images using a neural network and training of weighting coefficients based on comparison of the processing results with the supervisory signal is repeated. This training step is repeated a predetermined number of times or until the change in the error value due to the training converges to a predetermined range or less.

In step S805, the connection parameter determination unit 103 stores the error value at the end of step S804 as a variable Loss1. The connection parameter determination unit 103 stores the weighting coefficients of the neural network at the time of completion of step S804.

In step S806, the connection parameter determination unit 103 changes the connection parameter. For example, the connection parameter determination unit 103 may change a first connection parameter to a second connection parameter. FIG. 9A shows an example of changing the connection relationship table that holds the connection parameter. For example, the connection parameter determination unit 103 can obtain a connection relationship table for a randomly selected layer from the connection parameter holding unit 104, and replace m values on the randomly selected table. In the example of FIG. 9A, m=2.

In step S807, the operation control unit 108 performs a process using the neural network in accordance with the changed connection parameter in step S806. The result output unit 110 performs training of the weighting coefficients of the neural network based on the process results of the neural network with respect to the plurality of training images in the same manner as in step S804. Although the error value may temporarily increase due to the change of the connection parameter in step S806, weighting coefficients suitable for the connection relationship after the change are obtained by updating the weighting in step S807 in the same manner as in step S804.

In step S808, the connection parameter determination unit 103 stores the error value at the end of step S807 as Loss2.

In step S809, the connection parameter determination unit 103 trains the connection parameter based on the processing result obtained in accordance with the first connection parameter in step S804 and the processing result obtained in accordance with the second connection parameter in step S807. In this example, the connection parameter determination unit 103 may compare Loss1 and Loss2, and may employ the first connection parameter or the second connection parameter based on the comparison. For example, the connection parameter determination unit 103 can compare Loss1 and Loss2 according to the following equation (3).

$$Loss2 < Loss1 + \tau \qquad (3)$$

If the expression is true, the processing proceeds to step S810; if false, the processing proceeds to step S812. In the above equation, $\tau$ is a parameter that determines the tolerance of the perturbation, and can be specified by the user. Larger values of $\tau$ allow the connection relationship to change more frequently.

In step S810, the connection parameter determination unit 103 employs the second connection parameter from after the change in step S806. Further, in step S811, the connection parameter determination unit 103 decreases the value of $\tau$. For example, the connection parameter determination unit 103 can multiply the value of $\tau$ by $\alpha$ ($\alpha<1$). Thereafter, the processing returns to step S805, and the training of the weighting coefficients and training parameters is continued.

In step S812, the connection parameter determination unit 103 rejects the second connection parameter from after the change in step S806 and employs the first connection parameter from prior to the change. In addition, the connection parameter determination unit 103 returns the weighting coefficients of the neural network to the state before the connection parameter change, which was stored in step S805. In step S813, the operation control unit 108 determines whether or not to finish the training. For example, when the total number of steps of the previous training is equal to or larger than a predetermined number, the training can be terminated. If the training is not completed, the process returns to step S806, and the training of the connection parameter is continued. The above is the flow of the training process.

The training method is not limited to the above example. For example, in the example of FIG. 8, the connection relationship of randomly selected layers is changed, but training of the connection relationship may be performed in order from a low-order layer close to the input to a high-order layer. In the above example, a state in which the order has not been changed is used as the initial value of the connection parameter, but a state in which the order has been randomly switched at a predetermined ratio may be used as the initial value. This ratio may be specified by user input.

In the example of FIG. 8, the connection parameter is changed, and the a determination as to whether to reject or adopt the change is made. As another training method, it is also possible to perform training of the same number of steps for a plurality of connection parameters which are switched, and adopt the connection parameter for which the error is the smallest.

In addition, perturbations can also be applied to the connection parameters to add a connection, for example as shown in FIG. 9B. The connection list 911 of FIG. 9B shows that the first neuron group referring to the input features channel 1 to channel 3 and the second neuron group referring to the input features channel 4 to channel 6 are separated. On the other hand, the changed connection list 912 indicates that the first and second neuron groups further reference the channel 4 and channel 2 input features, respectively. Such changes increase the number of connections in the neural network. In this case, it is possible to compare an increase in the scale of the neural network with an improvement in the performance of the neural network, and to adopt a change when the performance is improved more in relation to the increase in the scale. For example, in step S809, it is possible to compare Loss1 and Loss2 in accordance with the following Equation (4).

$$-\tau \operatorname{Log}(\operatorname{Loss1}/\operatorname{Loss2}) < \operatorname{Log}(|W1|/|W2|) \qquad (4)$$

In this equation, $|W1|$ and $|W2|$ denote the number of connections (or the number of weighting coefficients) of the neural network before and after the change of the connection parameter, respectively. In the case of allowing a change in the total number of weighting coefficients as described above, training of the connection parameters may be performed in accordance with user input that indicates the upper limit of the final weighting coefficients.

In addition, distillation training can be used. More specifically, it is possible to train a large-scale neural network beforehand for an objective task. Then, a plurality of neural network candidates according to different connection parameters can be prepared, and transfer learning of the respective candidates can be performed so that a result approximating a large-scale neural network can be obtained. As a result, the candidate with the smallest error can be selected. The method described in Hinton, Geoffrey, Oriol Vinyals, and Jeff Dean. "Distilling the knowledge in a neural network." arXiv preprint arXiv:1503.02531 (2015), for example, can be used as the specific technique for the transfer learning. As described above, the method for training the connection parameter by the machine training is not limited to a specific form.

In this manner, by determining the connection relationship of the neuron groups by machine training, it is possible to improve the recognition accuracy of the neural network according to the first embodiment. In addition, as described above, the connection relationship of the neuron groups can be determined while considering the operation amount (or the number of weighting coefficients) of the neural network. According to these techniques, it is possible to easily obtain a neural network having a practical calculation speed and accuracy.

Third Embodiment

In the first and second embodiments, parallel processing is performed for each neuron group. On the other hand, in a CNN, a subsequent layer often has more feature channels. Therefore, the number of output channels of the neuron operation in one neuron group may also become larger in subsequent layers. In the third embodiment, parallel processing is performed even for a single neuron group.

FIG. 10 is a schematic view of processing according to the neural network in the third embodiment. In FIG. 10, there are two neuron groups 101 and 102, and output features of 8 channels corresponding to input features of 8 channels are calculated. On the other hand, there are four parallel processing units 1001a to 1001d in FIG. 10. One parallel processing unit 1001a to 1001d can output eight channels of output features 1013a to 1013c by performing a convolution operation on the input features 1011a to 1011d of four channels, respectively, in one processing cycle. Each of the parallel processing units 1001a to 1001d may have the same configuration as the connection setting unit 105, the reference setting unit 16a, the operation unit 17a, and the output unit 18a shown in FIG. 4.

FIG. 12 is a flowchart of the neuron operation for one layer of the neural network in the third embodiment. In step S1201, the operations of the parallel processing units 1001a to 1001d are started in parallel. In step S1202, the connection setting unit 105 reads the connection parameter in the same manner as in step S303. Here, the connection parameter may be stored in a register of each of the parallel processing units 1001a to 1001d in advance.

In steps S1203 to S1208, the parallel processing units 1001a to 1001d perform convolution operation processing in the same manner as in steps S305a to S310a of the first embodiment. As a result, each parallel processing unit 1001a to 1001d stores 8-channel output features 1013a to 1013d in memory. Here, the processing of each of the parallel processing units 1001a to 1001d ends.

In step S1209, the accumulation unit 1021a and the accumulation unit 1021b integrate the output features 1013a to 1013b and 1013c to 1013d for each of the corresponding neuron groups to generate the output feature 1014a and the output feature 1014b. Thus, the operation processing for one layer of the neural network ends.

Similarly to the first embodiment, the connection setting unit 105 can switch channels between neuron groups. That is, the connection setting unit 105 can set the referenced input features 1012a to 1012b by switching channels between the input features 1011a to 1011b and the input features 1011c to 1011d.

Instead of setting the connection relationship in units of feature channels, the connection setting unit 105 can set the connection relationship in units of blocks which include a plurality of channels. That is, the connection parameter may specify referenced input features (1012a to 1012d) in units of blocks. For example, as shown in FIG. 10, four channels processed by the parallel processing units 1001a to 1001d in one cycle may be used as one block. For example, the order of the input features 1011b and 1011c may be switched. In this case, the referenced input features 1012a, 1012b, 1012c, and 1012d correspond to the input features 1011a, 1011c, 1011b, and 1011d, respectively. In this manner, by setting the connection relationship in units of blocks of channels, it is possible to reduce the circuit scale of the data processing apparatus that performs the processing according to the neural network, as compared with the case where the connection relationship is set for each channel.

Further Embodiments

The method of setting the neuron group is not limited to the above example. For example, in FIG. 6A, a plurality of neurons are divided in blocks into a neuron group corresponding to a first half (channel 1 to channel 4) of the output features and a neuron group corresponding to the second half (channel 5 to channel 8) of the output features. However, for example, a plurality of neurons may be divided into neuron groups corresponding to odd-numbered channels and neuron groups corresponding to even-numbered channels. Thus, a neuron group may be configured according to a cyclic rule regarding the channel number. It is possible to set various neuron groups in accordance with the hardware or memory configurations.

FIG. 9C shows such an example. In the example of FIG. 9C, the number of channels of the input feature and the output feature is 8 channels each. In this example, the neurons are divided into four neuron groups, [channel 1, channel 5], [channel 2, channel 6], [channel 3, channel 7], and [channel 4, channel 8], according to the presence or absence of a connection between the channels of the input feature and the output feature, and no signal exchange is performed between the groups. In such an example, when training the connection parameters, the connection table 921 can be changed to the connection table 922 by imparting, as a perturbation, a switching of the channels of the input features. When processing is performed according to the connection table 922, signals are exchanged between the first and second groups. Similar to the second embodiment, if the performance of the neural network is improved, this replacement can be adopted, and a connection relationship in which the performance of the neural network is improved can be obtained without increasing the operation amount. Thus, the methods of the above-described embodiments are applicable even when a neuron group is not divided into blocks.

Further, instead of replacing a channel of an input feature, a channel of an output feature may be replaced. For example, the connection table 921 may be changed to the connection table 923. As described above, various methods can be used as the method of changing the connection relationship.

It is also possible to set the neuron groups according to a power set. For example, consider the case where an input feature has four channels A, B, C, and D, and an output feature has four channels W, X, Y, and Z. In this case, a neuron group can be set to use a power set of the channels of the input feature to calculate feature data for each channel of the output feature. For example, the W channel can be calculated from the A, B, and C channels, the X channel can be calculated from the B, C, and D channels, the Y channel can be calculated from the C, D, and A channels, and the Z channel can be calculated from the D, A, and B channels. In addition, a portion of the power set (for example, a $_4C_3$ combination of the power sets $x \in \{A, B, C, D\}$) may be associated with one output channel as an initial value, and the connection parameter may be further trained thereby.

Figure 13A:
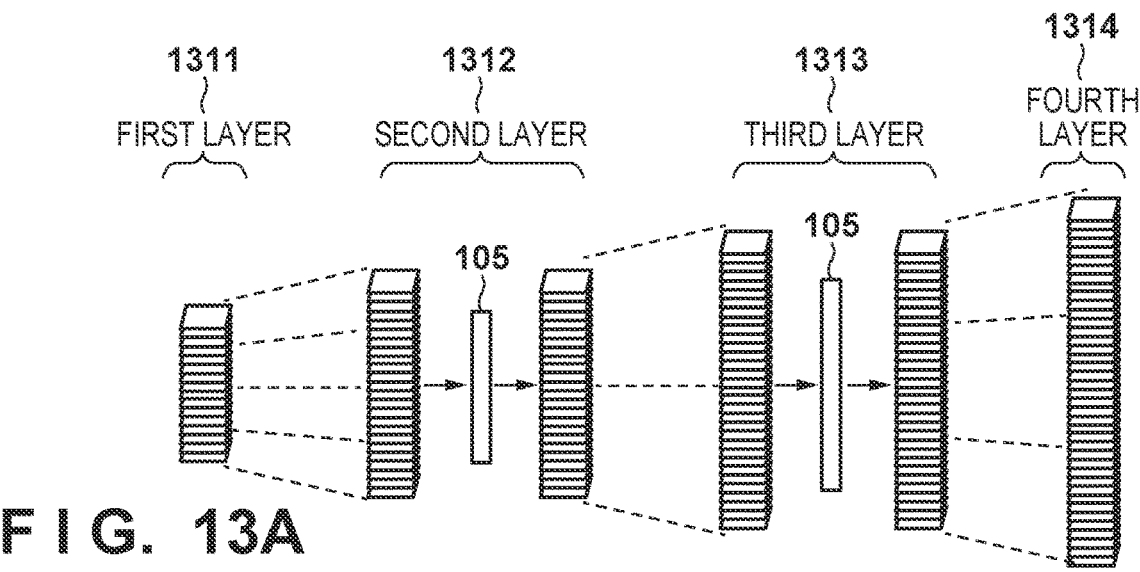
FIGS. 13A to 13C are views illustrating an example of a setting of neuron groups according to the embodiment.

Further, as shown in FIG. 13A, the number of neuron groups may be different for each layer. In general, increasing the number of neuron groups in an earlier layer is expected to have less impact on performance, as the need to use many features is often low in earlier layers.

The size of each neuron group may be the same or different. That is, when a first neuron group calculates a feature data of a third portion of an output feature and a second neuron group calculates a feature data of a fourth portion of an output feature, the sizes may be different between the third portion and the fourth portion. For example, the data amount of the feature data may be different between the third portion and the fourth portion.

Figure 13B:
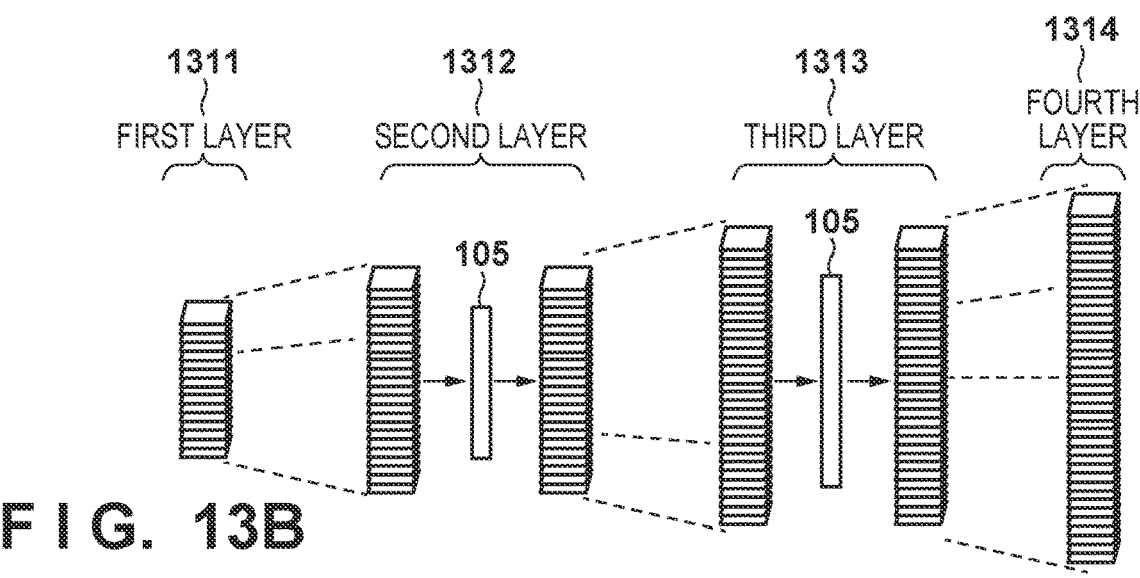

For example, in the example of FIG. 13B, a plurality of neuron groups are set so as to calculate output features of different numbers of channels. That is, in a layer for generating an output feature of 32 channels from an input feature of 32 channels, neurons may be divided into two groups as follows. Specifically, one neuron group calculates an output feature of 24 channels from an input feature of 24 channels, and the other neuron group calculates an output feature of 8 channels from an input feature of 8 channels.

According to such a configuration, the number of times of processing of the neuron operation performed in each neuron group is different. For example, since the operation amount determined by the product of the number of input channels and the number of output channels, the operation amount is 9:1 in this example. When performing an operation according to such a neural network using hardware, by providing a number of parallel processing units corresponding to the operation amount, the operation amount by the parallel processing units can be equalized.

Figure 13C:
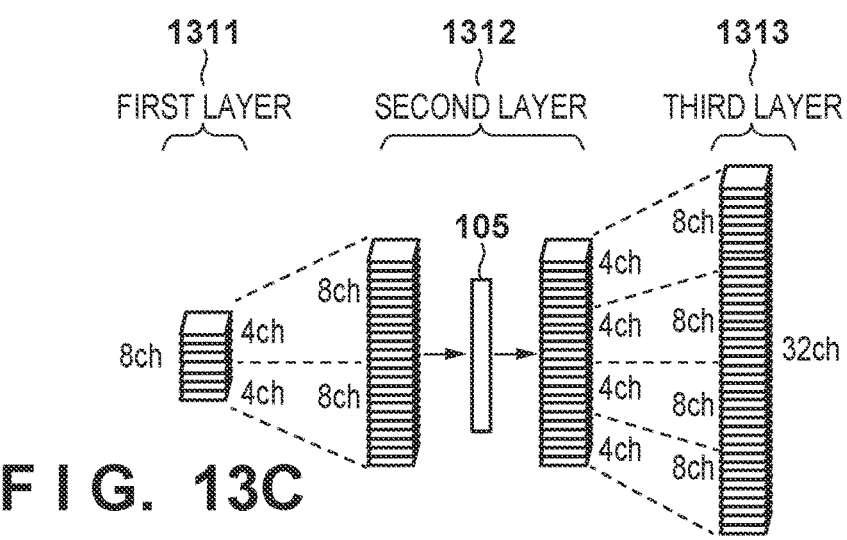

In the example of FIG. 13C, the number of neuron groups is controlled so that the operation amounts of the neuron operations performed in each neuron group are equal. In this example, an output features of 16 channels in the second layer 1312 is calculated from an input feature of 8 channels in the first layer 1311. In this example, an output feature of 16 channels in the second layer 1312 is calculated from an input feature of 32 channels in the third layer 1313. In this case, there may be two neuron groups providing an output feature to the second layer 1312 from an input feature from the first layer 1311 and four neuron groups providing an output feature to the third layer 131 from an input feature from the second layer 1312. In this case, the parallel processing unit that calculates an output feature of 8 channels can perform operations corresponding to the respective neuron groups, with respect to an input feature of 4 channels. In this example, the number of channels is increased in a later layer, but the number of neuron groups is also increased in accordance with the number of channels, so that the operation amounts of the operations corresponding to the respective neuron groups are the same. By such a configuration, parallel processing can be facilitated.

In this manner, various neuron group setting methods can be employed. The training apparatus may determine the number of neuron groups by training, or may determine the size of the neuron groups by training. That is, in a configuration in which a first neuron group calculates feature data of a third portion of an output feature and a second neuron group calculates feature data of a fourth portion of an output feature, the sizes of the third portion and the fourth portion may be determined by training.

The method of determining the setting of the neuron group by training is not particularly limited. For example, the aforementioned distillation training can be used to determine by machine training how to set up an appropriate neuron group. Also, as in the second embodiment, by randomly increasing or decreasing the number of neuron groups, a perturbative change can be imparted to the number of divisions of a neuron group, which is one connection parameter. By such a method, the number of divisions by which the performance of the neural network is improved can be determined by training.

Another example of a training method is to use a genetic algorithm. That is, it is possible to train the neural networks according to different connection parameters, and to combine neural networks having higher performance to generate a new neural network. For example, a new neural network can be generated by combining the layers in the first half of one neural network with the layers in the second half of another neural network.

Figure 14:
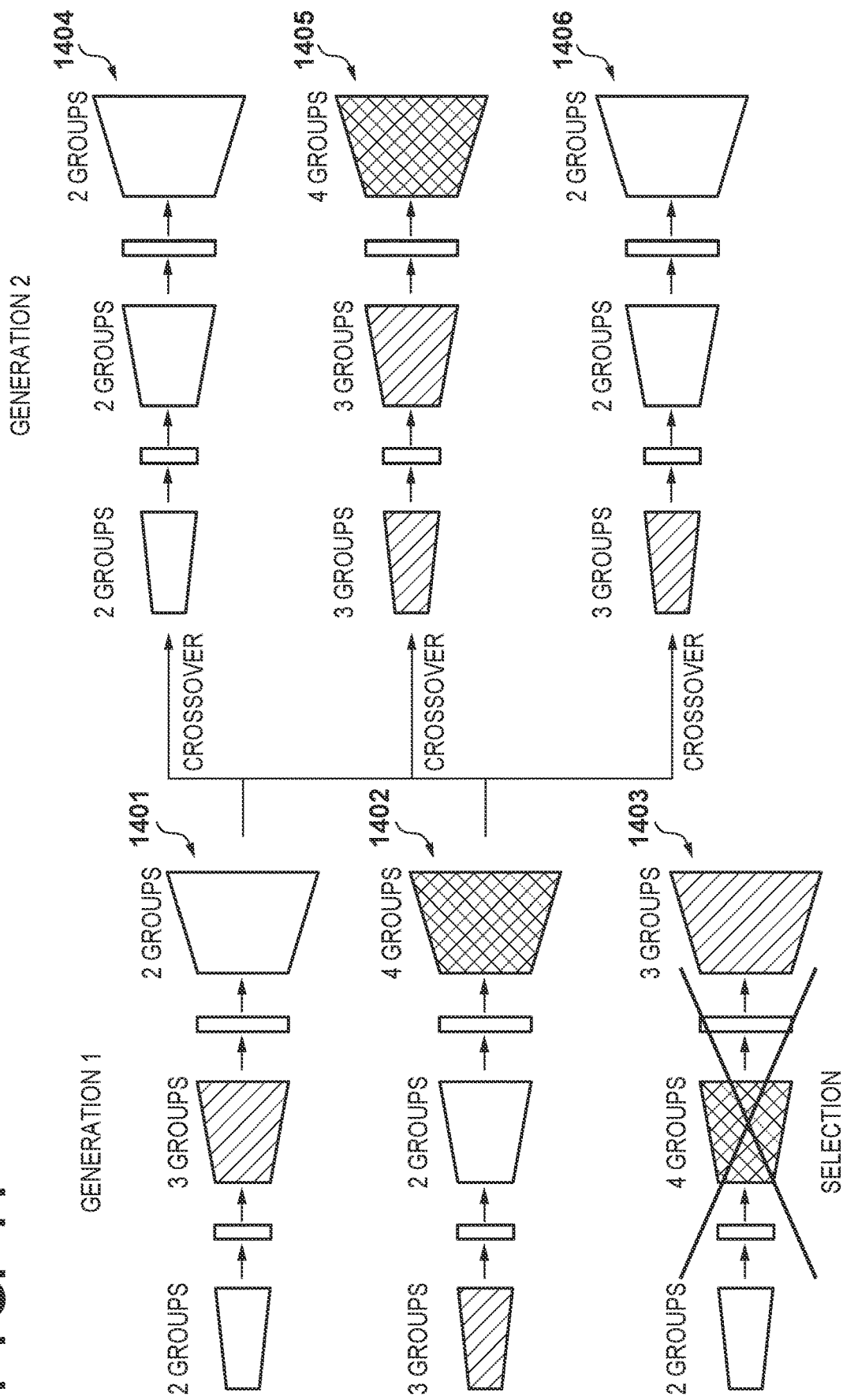
FIG. 14 is a view describing a training method using a genetic algorithm.

FIG. 14 shows an example of application of a genetic algorithm. In FIG. 14, three neural networks 1401 to 1403 are shown as candidates for generation 1. Among them, the neural network 1403 determined to have low recognition performance is selected (deleted). By combining portions of the neural networks 1401 and 1402 determined to have high performance, neural networks 1404 to 1406 are generated as candidates for generation 2. In this case, the neural networks can be evaluated in consideration of the scale of the neural network by using Equation (4) or the like.

Furthermore, the methods according to the above embodiments can be applied to various forms of neural networks, such as recursive neural networks. FIG. 15A shows the configuration of a Long Short Term Memory (LSTM) network, one kind of recursive neural network. As disclosed in Byeon, in an LSTM, by interconnecting a plurality of LSTM neurons, it is possible to perform processing of hierarchical pattern information or processing of two-dimensional pattern information. Each of the LSTM neurons is independently processed in parallel in one cycle. In FIG. 15A, $y_i^t$ is the recursive input to the ith LSTM neuron and is a high-dimensional vector. In FIG. 15B, recursive connections of LSTM neurons are developed. FIG. 15B represents essentially the same configuration as FIG. 15A. In the configuration shown in FIG. 15B, it can be understood that the output feature of the layer t+1 is generated from the input feature of the layer t. In addition, $y_i^t$ can be understood to be feature data of the i-th channel.

FIG. 15C shows a state in which the configuration according to the above embodiment is applied to the LSTM network shown in FIG. 15B. The connection setting unit 105 can mix some of the recursive inputs y it generated by the respective LSTM neurons to generate an input $y'^t_i$. Such processing can be performed in the same manner as the processing in which the connection setting unit 105 generates the referenced input feature 12 from the input features 11a and 11b in the example of FIG. 1. The input $y'^t_i$ thus generated is recursively input to the LSTM neurons. In such a configuration, it is thereby possible to change the states of the respective LSTM neurons on the basis of the signals from the LSTM neurons which are separated in phase. Therefore, it is possible to perform more complicated operation processing compared to the configuration of FIG. 15A while enabling parallel processing by the respective LSTM neurons and suppressing increases in operation processing.

The data processing apparatus and the training apparatus according to an embodiment of the present invention may be configured by a plurality of information processing apparatuses connected via a network, for example.

The data processing apparatus and the training apparatus according to the above embodiment are realized by dedicated hardware. On the other hand, some or all of the processing units such as the data input unit 100, the connection parameter determination unit 103, the operation control unit 108, the result output unit 110, and the constraint indication unit 122 may be realized by a computer.

Figure 11:
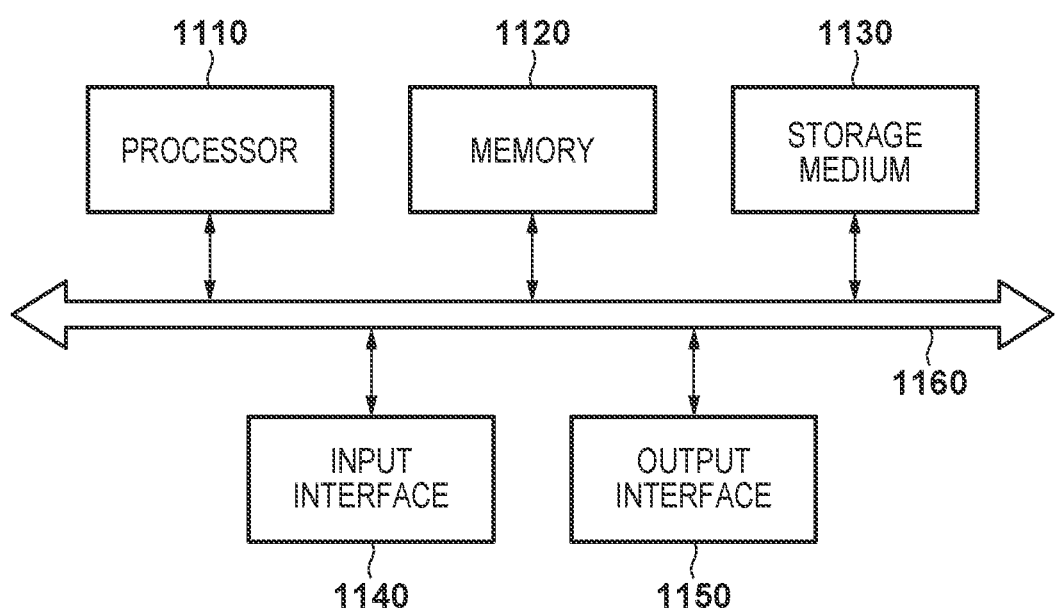
FIG. 11 is a view illustrating an example of a configuration of a computer.

FIG. 11 is a view illustrating a basic configuration of a computer. In FIG. 11, a processor 1110, for example a CPU, controls the operation of the entire computer. A memory 1120 is, for example, a RAM, and temporarily stores programs and data, etc. A computer readable storage medium 1130, for example, a hard disk or a CD-ROM, stores programs, data, and the like over a long period of time. In this embodiment, a program for realizing the functions of each unit stored in the storage medium 1130 is read into the memory 1120. Then, by operating the processor 1110 in accordance with a program on the memory 1120, the functions of each unit are realized. In FIG. 11, an input interface 1140 is an interface for obtaining information from an external device. Also, an output interface 1150 is an interface for outputting information from an external device. The bus 1160 connects the above-described units and enables data exchange.

The neural networks described in the above embodiments are also embodiments of the present invention. The neural network can be defined by information indicating the hierarchical structure (e.g., the number of layers and the type of operation performed at each layer) and information indicating the weighting coefficients between the layers. The neural network according to the embodiment described above is further defined by the connection parameter. According to information defining such a neural network, the above-described data processing apparatus or computer can perform an operation according to the neural network on input data. Therefore, the information defining such a neural network corresponds to one kind of program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-123945, filed Jul. 2, 2019, which is hereby incorporated by reference herein in its entirety.

What is claimed is:

1. A data processing apparatus for detecting an object from an image using a hierarchical neural network, comprising:
at least one memory storing computer-executable instructions and at least one processor configured to execute the computer-executable instructions stored in the at least one memory and/or at least one circuit;
parallel first and second neural networks;
an obtaining unit configured to obtain a table which defines different first and second portions, wherein the first portion comprises both a first part of channels of a first layer of the first neural network and a first part of channels of a first layer of the second neural network, both of the first parts of channels being referenced in order to obtain feature data of a third portion of a second layer of the first neural network, wherein the second portion comprises both a second part of channels of the first layer of the first neural network, different from the first part of channels of the first layer of the first neural network, and a second part of channels of the first layer of the second neural network, different from the first part of channels of the first layer of the second neural network, both of the second parts of channels being referenced, without both of the first parts of channels being referenced, in order to obtain feature data of a fourth portion of a second layer of the second neural network, and wherein both of the first parts of channels are referenced, without both of the second parts of channels being referenced, in order to obtain the feature data of the third portion of the second layer of the first neural network; and an operation unit configured to obtain the feature data of the third portion based on feature data of the first portion identified using the table and on a weighting parameter between the first and second layers of the first neural network, and to obtain the feature data of the fourth portion based on feature data of the second portion identified using the table and on a weighting parameter between the first and second layers of the second neural network, wherein the at least one memory storing computer-executable instructions and the at least one processor configured to execute the computer-executable instructions stored in the at least one memory and/or the at least one circuit are configured to implement at least the obtaining unit and the operation unit.

2. The data processing apparatus according to claim 1, wherein the first portion and the second portion of the first layer do not overlap.

3. The data processing apparatus according to claim 1, wherein the first portion and the second portion of the first layer partially overlap.

4. The data processing apparatus according to claim 1, wherein a size of the third portion of the second layer is different from a size of the fourth portion of the second layer.

5. The data processing apparatus according to claim 1, wherein the at least one memory storing computer-executable instructions and the at least one processor configured to execute the computer-executable instructions stored in the at least one memory and/or the at least one circuit are further configured to implement an instruction unit configured to instruct an object type, wherein the obtaining unit is further configured to obtain the table corresponding to the instructed object type.

6. The data processing apparatus according to claim 1, wherein the operation unit comprises a first processing unit and a second processing unit which operate in parallel, the first processing unit is configured to obtain the feature data of the third portion of the second layer from the feature data of the first portion of the first layer, and the second processing unit is configured to obtain feature data of the fourth portion of the second layer from the feature data of the second portion of the first layer.

7. The data processing apparatus according to claim 1, wherein a connection parameter is stored in the table, and the connection parameter defines the first portion and the second portion of the first layer in units of channels.

8. The data processing apparatus according to claim 7, wherein the connection parameter defines the first portion and the second portion of the first layer in units of blocks that each includes a plurality of channels.

9. The data processing apparatus according to claim 7, wherein the operation unit is further configured to obtain the feature data of each channel included in the third portion of the second layer using the feature data of all channels included in the first portion of the first layer and without using the feature data of the channels included in the second portion of the first layer.

10. The data processing apparatus according to claim 1, wherein the neural network is a convolutional neural network or a recursive neural network.

11. A training apparatus operable to perform training of a hierarchical neural network, the apparatus comprising:

at least one memory storing computer-executable instructions and at least one processor configured to execute the computer-executable instructions stored in the at least one memory and/or at least one circuit configured to implement at least:

an obtaining unit configured to obtain training data and supervisory data indicating processing results for the training data;

a data processing unit configured to obtain a result of processing the training data by inputting the training data to the neural network, the data processing unit comprising an operation unit configured to, in accordance with a connection parameter defining a first portion of a first layer of the neural network to be referenced in order to obtain feature data of a third portion of a second layer of the neural network and defining a second portion of the first layer to be referenced in order to obtain feature data of a fourth portion of the second layer, obtain the feature data of the third portion of the second layer from feature data of the first portion of the first layer and obtain the feature data of the fourth portion of the second layer from feature data of the second portion of the first layer; and a training unit configured to perform training of the connection parameter and weighting coefficients between layers of the neural network based on the supervisory data and a result of processing the training data, wherein the neural network comprises a first neural network and a second neural network, and wherein the first portion comprises both a first part of channels of a first layer of the first neural network and a first part of channels of a first layer of the second neural network, both of the first parts of channels being referenced in order to obtain feature data of a third portion of a second layer of the first neural network, wherein the second portion comprises both a second part of channels of the first layer of the first neural network, different from the first part of channels of the first layer of the first neural network, and a second part of channels of the first layer of the second neural network, different from the first part of channels of the first layer of the second neural network, both of the second parts of channels being referenced, without both of the first parts of channels being referenced, in order to obtain feature data of a fourth portion of a second layer of the second neural network, and wherein both of the first parts of channels are referenced, without both of the second parts of channels being referenced, in order to obtain the feature data of the third portion of the second layer of the first neural network.

12. The training apparatus according to claim 11, wherein the training unit is further configured to perform training of the connection parameter based on both a result of processing the training data that the data processing unit obtained according to a first connection parameter and a result of processing the training data that the data processing unit obtained according to a second connection parameter.

13. The training apparatus according to claim 11, wherein the training unit is further configured to determine sizes of the first portion and the second portion of the second layer by training.

14. The training apparatus according to claim 11, wherein
the obtaining unit is further configured to acquire a user input indicating a constraint condition on the connection parameter obtained by training, and
the training unit is further configured to perform training of the connection parameter according to the constraint condition.

15. A method of detecting an object from an image using a hierarchical neural network including parallel first and second neural networks, comprising:
obtaining a table which defines different first and second portions, wherein the first portion comprises both a first part of channels of a first layer of the first neural network and a first part of channels of a first layer of the second neural network, both of the first parts of channels being referenced in order to obtain feature data of a third portion of a second layer of the first neural network, wherein the second portion comprises both a second part of channels of the first layer of the first neural network, different from the first part of channels of the first layer of the first neural network, and a second part of channels of the first layer of the second neural network, different from the first part of channels of the first layer of the second neural network, both of the second parts of channels being referenced, without both of the first parts of channels being referenced, in order to obtain feature data of a fourth portion of a second layer of the second neural network, and wherein both of the first parts of channels are referenced, without both of the second parts of channels being referenced, in order to obtain the feature data of the third portion of the second layer of the first neural network; and
obtaining the feature data of the third portion based on feature data of the first portion identified using the table and on a weighting parameter between the first and second layers of the first neural network, and obtaining the feature data of the fourth portion based on feature data of the second portion identified using the table and on a weighting parameter between the first and second layers of the second neural network.

16. A method of training hierarchical neural network, the method comprising:
obtaining training data and supervisory data indicating processing results for the training data;
obtaining a result of processing the training data by inputting the training data to the neural network, comprising, in accordance with a connection parameter defining a first portion of a first layer of the neural network to be referenced in order to obtain feature data of a third portion of a second layer of the neural network and defining a second portion of the first layer to be referenced in order to obtain feature data of a fourth portion of the second layer, obtaining the feature data of the third portion of the second layer from feature data of the first portion of the first layer and obtaining the feature data of the fourth portion of the second layer from feature data of the second portion of the first layer; and
performing training of the connection parameter and weighting coefficients between layers of the neural network based on the supervisory data and a result of processing the training data,
wherein the neural network comprises a first neural network and a second neural network, and
wherein the first portion comprises both a first part of channels of a first layer of the first neural network and a first part of channels of a first layer of the second neural network, both of the first parts of channels being referenced in order to obtain feature data of a third portion of a second layer of the first neural network, wherein the second portion comprises both a second part of channels of the first layer of the first neural network, different from the first part of channels of the first layer of the first neural network, and a second part of channels of the first layer of the second neural network, different from the first part of channels of the first layer of the second neural network, both of the second parts of channels being referenced, without both of the first parts of channels being referenced, in order to obtain feature data of a fourth portion of a second layer of the second neural network, and wherein both of the first parts of channels are referenced, without both of the second parts of channels being referenced, in order to obtain the feature data of the third portion of the second layer of the first neural network.

17. A non-transitory computer-readable medium storing a program which, when executed by a computer comprising a processor and a memory, causes the computer to perform a method of detecting an object from an image using a hierarchical neural network including parallel first and second neural networks comprising:
obtaining a table which defines different first and second portions, wherein the first portion comprises both a first part of channels of a first layer of the first neural network and a first part of channels of a first layer of the second neural network, both of the first parts of channels being referenced in order to obtain feature data of a third portion of a second layer of the first neural network, wherein the second portion comprises both a second part of channels of the first layer of the first neural network, different from the first part of channels of the first layer of the first neural network, and a second part of channels of the first layer of the second neural network, different from the first part of channels of the first layer of the second neural network, both of the second parts of channels being referenced, without both of the first parts of channels being referenced, in order to obtain feature data of a fourth portion of a second layer of the second neural network, and wherein both of the first parts of channels are referenced, without both of the second parts of channels being referenced, in order to obtain the feature data of the third portion of the second layer of the first neural network; and
obtaining the feature data of the third portion based on feature data of the first portion identified using the table and on a weighting parameter between the first and second layers of the first neural network, and obtaining the feature data of the fourth portion based on feature data of the second portion identified using the table and on a weighting parameter between the first and second layers of the second neural network.

18. A non-transitory computer-readable medium storing a program which, when executed by a computer comprising a processor and a memory, causes the computer to perform:
obtaining training data and supervisory data indicating processing results for the training data;
obtaining a result of processing the training data by inputting the training data to the neural network, comprising, in accordance with a connection parameter defining a first portion of a first layer of the neural network to be referenced in order to obtain feature data of a third portion of a second layer of the neural network and defining a second portion of the first layer to be referenced in order to obtain feature data of a fourth portion of the second layer, obtaining the feature data of the third portion of the second layer from feature data of the first portion of the first layer and obtaining the feature data of the fourth portion of the second layer from feature data of the second portion of the first layer; and
performing training of the connection parameter and weighting coefficients between layers of the neural network based on the supervisory data and a result of processing the training data,
wherein the neural network comprises a first neural network and a second neural network, and
wherein the first portion comprises both a first part of channels of a first layer of the first neural network and a first part of channels of a first layer of the second neural network, both of the first parts of channels being referenced in order to obtain feature data of a third portion of a second layer of the first neural network, wherein the second portion comprises both a second part of channels of the first layer of the first neural network, different from the first part of channels of the first layer of the first neural network, and a second part of channels of the first layer of the second neural network, different from the first part of channels of the first layer of the second neural network, both of the second parts of channels being referenced, without both of the first parts of channels being referenced, in order to obtain feature data of a fourth portion of a second layer of the second neural network, and wherein both of the first parts of channels are referenced, without both of the second parts of channels being referenced, in order to obtain the feature data of the third portion of the second layer of the first neural network.

* * * * *